(12) United States Patent
Seykora et al.

(10) Patent No.: US 12,527,607 B2
(45) Date of Patent: Jan. 20, 2026

(54) ADJUSTABLE JOINT OPTIMIZATIONS

(71) Applicant: Acumed LLC, Hillsboro, OR (US)

(72) Inventors: Andrew W. Seykora, Portland, OR (US); Rebecca Schaldach, Portland, OR (US); David VanVleet, Hillsboro, OR (US); Joseph Pia, Willow Street, PA (US); Kevin Nguyen, Beaverton, OR (US)

(73) Assignee: Acumed LLC, Hillsboro, OR (US)

( * ) Notice: Subject to any disclaimer, the term of this patent is extended or adjusted under 35 U.S.C. 154(b) by 6 days.

(21) Appl. No.: 18/416,998

(22) Filed: Jan. 19, 2024

(65) Prior Publication Data
US 2024/0245436 A1    Jul. 25, 2024

Related U.S. Application Data

(60) Provisional application No. 63/440,605, filed on Jan. 23, 2023.

(51) Int. Cl.
| | | |
|---|---|---|
| *A61B 17/80* | (2006.01) | |
| *A61B 17/88* | (2006.01) | |
| *A61B 17/00* | (2006.01) | |
| *A61B 17/56* | (2006.01) | |

(52) U.S. Cl.
CPC .......... *A61B 17/80* (2013.01); *A61B 17/8057* (2013.01); *A61B 17/808* (2013.01); *A61B 17/8863* (2013.01); *A61B 2017/00526* (2013.01); *A61B 2017/564* (2013.01)

(58) Field of Classification Search
CPC .......... A61B 2017/00526; A61B 17/80; A61B 17/8052; A61B 17/8057; A61B 17/808
See application file for complete search history.

(56) References Cited

U.S. PATENT DOCUMENTS

| | | | |
|---|---|---|---|
| 6,241,731 B1 * | 6/2001 | Fiz .................... | A61B 17/8047 606/65 |
| 7,090,676 B2 | 8/2006 | Huebner et al. | |
| 8,784,458 B1 * | 7/2014 | White ............... | A61B 17/8061 606/291 |
| 8,915,918 B2 | 12/2014 | Graham et al. | |
| 9,113,970 B2 * | 8/2015 | Lewis ............... | A61B 17/8057 |

(Continued)

OTHER PUBLICATIONS

International Search Report corresponding to related International Patent Application No. PCT/US2024/012144 mailed May 6, 2024, 3 pages.

(Continued)

*Primary Examiner* — Larry E Waggle, Jr.
(74) *Attorney, Agent, or Firm* — Knobbe, Martens, Olson & Bear, LLP

(57) ABSTRACT

A method of manufacturing an apparatus for fixing bone includes mating a first plate with a second plate, where the first plate includes a screw slot and the second plate includes a through hole corresponding to the screw slot; and placing a screw body into the screw slot and the through hole. The screw body includes a screw portion and an insertion portion. The screw body is placed into the screw slot using the insertion portion of the screw body. The method further includes removing the insertion portion of the screw body. The screw portion remains within the screw slot and the through hole after the insertion portion is removed.

24 Claims, 16 Drawing Sheets

(56) References Cited

U.S. PATENT DOCUMENTS

| | | | |
|---|---|---|---|
| 9,433,448 | B2 | 9/2016 | Ehmke et al. |
| 9,433,451 | B2 | 9/2016 | Ehmke et al. |
| 9,463,055 | B2 | 10/2016 | Ehmke et al. |
| 9,526,542 | B2 | 12/2016 | Ehmke |
| 9,956,015 | B2 | 5/2018 | Ehmke et al. |
| 10,080,596 | B2 | 9/2018 | Ehmke |
| 10,117,685 | B2 | 11/2018 | Ehmke et al. |
| 10,159,515 | B2 | 12/2018 | Ehmke et al. |
| 10,531,903 | B2 * | 1/2020 | Daly ................. A61B 17/8685 |
| 10,610,368 | B2 | 4/2020 | Ehmke |
| 11,123,116 | B2 * | 9/2021 | Ehmke .................. A61B 17/80 |
| 11,219,466 | B2 | 1/2022 | Seykora et al. |
| 11,844,555 | B2 | 12/2023 | Ehmke et al. |
| 2006/0235404 | A1 | 10/2006 | Orbay et al. |
| 2011/0218534 | A1 | 9/2011 | Prandi et al. |
| 2014/0081269 | A1 | 3/2014 | Biedermann |
| 2021/0393302 | A1 | 12/2021 | Ehmke et al. |

OTHER PUBLICATIONS

International Written Opinion corresponding to related International Patent Application No. PCT/US2024/012144 mailed May 6, 2024, 5 pages.

International Preliminary Report on Patentability, re PCT Application No. PCT/US202/012144, dated Aug. 7, 2025 in 7 pages.

* cited by examiner

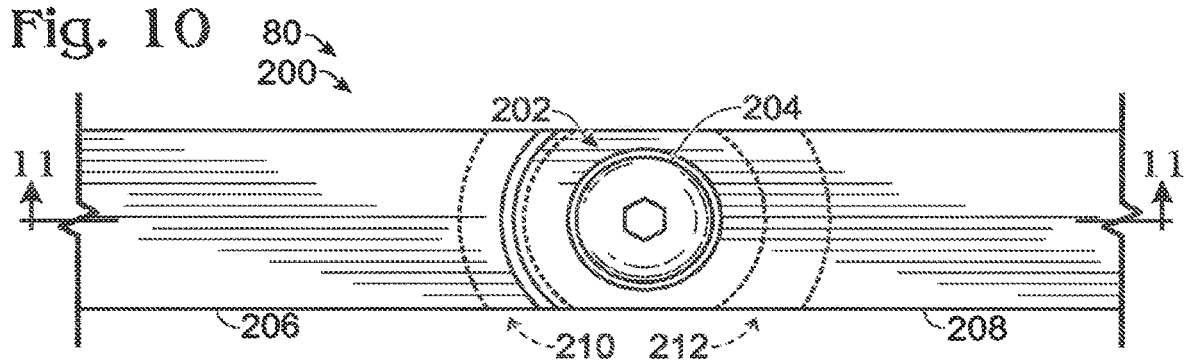
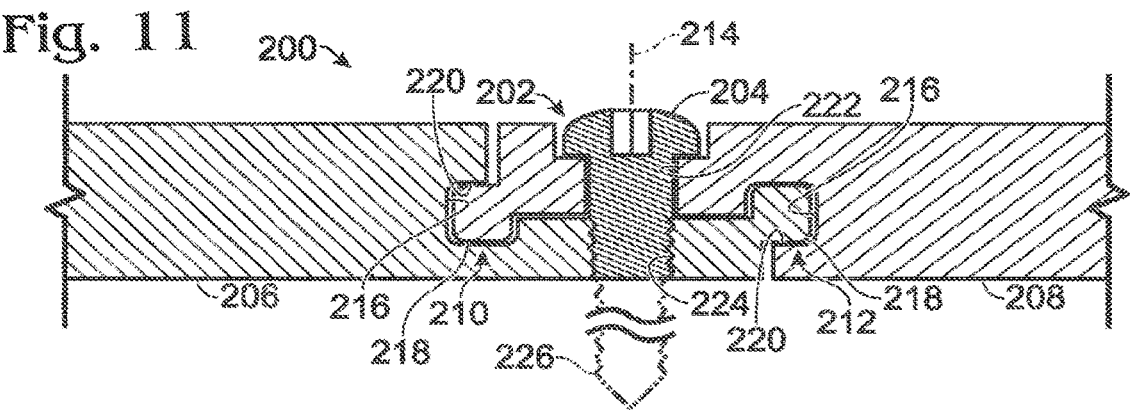

ADJUSTABLE JOINT OPTIMIZATIONS

PRIORITY CLAIM

This application claims priority to U.S. Provisional Patent Application No. 63/440,605 filed on Jan. 23, 2023, the entire contents of which are hereby incorporated by reference and relied upon.

BACKGROUND

The human skeleton is composed of 206 individual bones that perform a variety of important functions, including support, movement, protection, storage of minerals, and formation of blood cells. These bones can be grouped into two categories, the axial skeleton and the appendicular skeleton. The axial skeleton consists of 80 bones that make up the body's center of gravity, and the appendicular skeleton consists of 126 bones that make up the body's appendages. The axial skeleton includes the skull, vertebral column, ribs, and sternum, among others, and the appendicular skeleton includes the long bones of the upper and lower limbs, and the clavicles and other bones that attach these long bones to the axial skeleton, among others.

To ensure that the skeleton retains its ability to perform its important functions, and to reduce pain and disfigurement, fractured bones should be repaired promptly and properly. Typically, fractured bones are treated using a fixation device that reinforces the bone and keeps bone fragments aligned during healing. Fixation devices may take a variety of forms, including casts for external fixation and bone plates for internal fixation, among others. Bone plates are implantable devices that can be mounted on bone with the plate spanning a fracture. To use a bone plate to repair a fractured bone, a surgeon (1) selects an appropriate plate, (2) reduces (sets) the fracture, and (3) attaches the plate to opposite sides of the fracture using suitable fasteners, such as bone screws, so that pieces of the bone are fixed relative to one another.

The bone plate often is formed integrally as one piece and then is bent intraoperatively by a surgeon to custom-fit the bone plate to a subject's bone. However, bending a unitary bone plate has various disadvantages. For example, bending can be time-consuming, can weaken the bone plate, may be difficult to control for small changes to the plate shape, and/or can be particularly challenging for in-plane deformation of the bone plate where the plate is generally most resistant to deformation.

SUMMARY

The present disclosure provides new and innovative systems, devices, and methods for fixing bone. In some examples, an apparatus for fixing bone may include a first plate comprising a screw slot, and a second plate coupled to the first plate in a region of overlap by a hinge joint configured to allow a rotation of the first and second plates relative to one another about a pivot axis. The second plate may include a through hole corresponding to the screw slot. The screw slot and the through hole may be disposed in the region of overlap. The apparatus may further include a screw disposed in the screw slot and the through hole. The screw may include a threaded portion. The first plate, the second plate, and the screw may define a range of rotation for the first and second plates about the pivot axis.

In some examples, a method of manufacturing an apparatus for fixing bone according to the present disclosure is provided. The method may include mating a first plate with a second plate, where the first plate may include a screw slot and the second plate includes a through hole corresponding to the screw slot; and placing a screw body into the screw slot and the through hole. The screw body may include a screw portion and an insertion portion. The screw body may be placed into the screw slot using the insertion portion of the screw body. The method may further include removing the insertion portion of the screw body. The screw portion may remain within the screw slot and the through hole after the insertion portion is removed.

In some examples, another method of manufacturing an apparatus for fixing bone is provided. The method may include mating a first plate with a second plate, where the first plate may include a screw slot and the second plate comprises a through hole corresponding to the screw slot; placing a screw into the screw slot and the through hole; and hitting the screw. The hitting of the screw may cause at least a partial deformation to at least one of the screw and a portion of the first plate or the second plate that is connected to the screw, thereby preventing the screw from backing out from the screw slot and the through hole.

Additional features and advantages of the disclosed systems, devices, and methods are described in, and will be apparent from, the following Detailed Description and the Figures.

BRIEF DESCRIPTION OF THE FIGURES

FIG. 10 is a fragmentary plan view of an exemplary bone plate having a hinge joint locked with a connector, with plate members of the bone plate fitted together via a pair of arcuate, complementary mating regions centered around and bracketing the pivot axis of the hinge joint.

FIG. 11 is a longitudinal sectional view of the bone plate of FIG. 10, taken generally along line 11-11 of FIG. 10.

DETAILED DESCRIPTION OF EXAMPLE EMBODIMENTS

Figure 1:
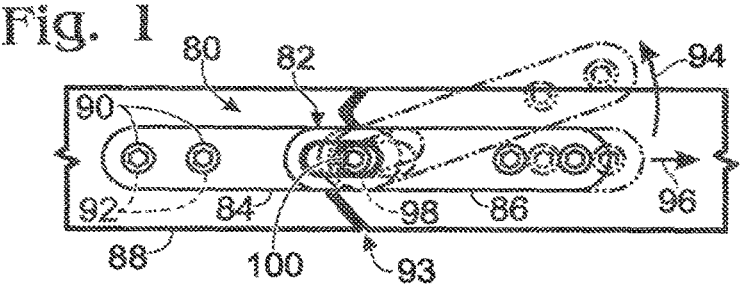
FIG. 1 is a schematic view of an exemplary bone plate having a movable joint connecting a pair of plate members and attached to a broken bone, and illustrating exemplary plate member movements permitted by a joint of the present disclosure.

The present disclosure provides systems, devices, and methods for fixing bone. FIG. 1 shows a schematic view of an exemplary bone plate 80 having a movable joint 82 (also called a movable connection) connecting a pair of plate members 84, 86. Each plate member may be mounted (e.g., separately mounted) to a bone 88 using one or more fasteners 90 (such as bone screws, pins, wires, rivets, etc.). Each fastener may be received in a through-hole (interchangeably termed an opening) defined by the plate member, and extends into the bone. (The plate member interchangeably may be called a plate, a plate piece, or a mounting member.) The bone 88 may have at least one discontinuity, such as a fracture 93 or cut, spanned by the bone plate. The joint 82 may overlap the discontinuity, as shown here, or may be offset along the bone from the discontinuity. The bone plate 80 interchangeably may be termed a fixation device or a bone plate assembly.

Exemplary relative movements of plate members 84, 86 that may be permitted by movable joint 82 are illustrated in phantom and identified by motion arrows 94, 96. The plate members may be movable relative to one another in at least one plane and/or about at least one rotation axis, indicated by a rotation arrow 94, to change the angular orientation of the plate members relative to one another. The rotation may be in-plane or out-of-plane with respect to a plane defined by the bone plate, and may be about a long axis of the bone plate and/or plate member or about another axis. The plate members also or alternatively may be adjustable relative to one another along at least one displacement axis, indicated by a displacement arrow 96. The displacement axis may or may not be linear, to provide net translational displacement without or with rotation of the plate members relative to one another.

The rotation or movement of plate members relative to one another that is "in-plane" may occur in a plane that is at least generally parallel to a plane defined by one or more of the plate members. The in-plane movement may for example, be within about 20, 10, 5, 2, or 1 degree(s) of perfectly parallel to the plane defined by the one or more of the plate members. Single-axis joints (e.g., hinge joints) and multi-axis joints may permit in-plane rotation.

Each rotation axis (and/or plane in which rotation occurs) may have any suitable position and orientation with respect to the bone plate. The rotation axis may be fixed or variable with respect to one or both plate members. If variable, the position of the rotation axis may change before or during rotation of the plate members to change their angular orientation. The rotation axis may or may not pass through bone plate 80 and/or joint 82. Whether or not the rotation axis passes through the bone plate or joint, the rotation axis may have any suitable relationship to a plane (e.g., a length-width plane) and/or a long axis defined by the bone plate and/or at least one plate member. The rotation axis may be transverse (e.g., substantially or at least generally perpendicular), or substantially or at least generally parallel to the plane or long axis. For example, the rotation axis may be within about 20, 10, 5, 2, or 1 degree(s) of perfectly parallel or perfectly perpendicular.

Each translational displacement axis may have any suitable orientation with respect to the bone plate. The displacement axis may be at least generally or substantially parallel, transverse (e.g., perpendicular), or oblique to the plane and/or long axis defined by the bone plate and/or at least one plate member. Accordingly, net movement of the plate members relative to one another parallel to the displacement axis may change a longitudinal offset and/or a transverse offset of the plate members relative to one another. Both offsets can be changed at the same time if the displacement axis is oblique to each of the characteristic orthogonal axes defined by the bone plate or a plate member thereof. In any event, the transverse offset may be adjustable in a plane at least generally or substantially parallel to a plane defined by the bone plate and/or at least one plate member, and/or in a plane that is oblique or at least generally or substantially perpendicular to the plane defined by the bone plate.

The bone plate may have any suitable number of plate members, and number and position(s) of movable joints connecting the plate members to one another (e.g., connecting the plate members end-to-end). For example, the bone plate may have 2, 3, 4, or more plate members and/or 1, 2, 3, or more movable joints. In some examples, the bone plate may have N plate members and N–1 movable joints. If the bone plate has more than one movable joint, the joints may have any suitable position relative to one another, such as spaced along the long axis of the bone plate from one another, or spaced obliquely or perpendicular to the long axis. Each movable joint may be located at any suitable position with respect to a pair of plate members that are connected to one another by the joint. The joint may be located near the end of each of the plate members or may be spaced substantially from the opposite ends of at least one of the plate members.

The plate members may or may not be permanently connected to one another at a movable joint. A permanent connection between plate members may be created during manufacture of a bone plate, such that the plate members always remain connected to one another during normal handling and installation. Plate members that are permanently connected to one another are designed never to be accidentally disassembled by a user. The plate members cannot be completely separated from one another without damaging the bone plate (e.g., by cutting, breaking, plastically deforming, melting, or the like, a region of the bone plate), or without the use of one or more tools unrelated to installation or adjustment of the bone plate. A bone plate with plate members that are permanently connected to one another at a hinge joint offers the advantage of a hinged bone plate without the risk of dropping or losing a piece of the hinge joint (e.g., a connector) during surgery.

Each plate member may have any suitable structure. The plate member may or may not be elongate. The plate member may have an outer surface (interchangeably termed an outer side or top side) opposite an inner surface (interchangeably termed an inner side or bottom side). The plate members collectively may form an outer surface (interchangeably termed a top surface) and an inner surface (interchangeably termed a bottom surface) of the bone plate. The inner surface and the outer surface of the bone plate (and each plate member) respectively face toward and away from a bone when the bone plate is attached to the bone. The inner surface may be configured to contact bone.

Each plate member may be one piece, with no parts that move relative to one another without deformation of the plate member. The one-piece plate member may be formed integrally, such that the entire plate member is continuous (monolithic). The plate member has a length, a width, and a thickness, where the thickness is less than the length and width, such as less than 50%, 20%, or 10% of the length and/or width. The length is generally greater than the width, but in some examples the length and width may be equal.

Each plate member may define at least one opening 92 having any suitable structure and position. Each opening 92 may be a through-hole (interchangeably termed an aperture) that extends through the plate member from the outer surface to the inner surface thereof. The through-hole may have a closed perimeter (completely bounded circumferentially) or an open perimeter. The through-hole or other opening may define an axis that is substantially perpendicular or oblique to the plane of the plate member. Each through-hole or other opening may or may not be elongated in the plane of the plate member. Accordingly, the through-hole may or may not be circular. The through-hole or other opening may or may not have attachment structure formed by a wall thereof that allows a fastener, such as an externally threaded fastener, to be attached to the plate member at the through-hole. The attachment structure may for example, be an internal thread or at least one linear lip.

The plate member may have any suitable number of openings 92. If the plate member has two or more openings, the openings may be distributed in a direction along and/or across the bone plate from one another.

Each movable joint 82 may have any suitable structure. The joint may be formed at a region of overlap of a pair of the plate members, where the plate members overlap one another and respective joint surfaces of the plate members face and contact one another. The joint surfaces may be at least generally complementary to one another, with one joint surface being concave and the other joint surface convex. In some examples, one or more both joint surfaces may include surface features that improve the stability of the locked joint by resisting slippage of the joint surfaces relative to one another. The surface features may include one or more protrusions and/or one more voids, each of which may or may not be deformable. In some examples, the surface features may include a uniform array of projections and/or recesses, such as a set of teeth defined by one or both joint surfaces. In some examples, the surface features of one joint surface may be complementary to one or more of the surface features of the other joint surface, such that the joint surfaces can be mated with one another to resist slippage.

In some examples, the joint surfaces can be mated in a plurality of discrete registers that are offset from one another by the spacing of the surface features of at least one of the joint surfaces. For example, one of the joint surfaces may define a plurality of teeth and the other joint surface may form at least one tooth. The teeth of the one joint surface can mate with the at least one tooth of the other joint surface in a plurality of different and discrete registers. Each of the teeth may be symmetrical or asymmetrical in cross section. If symmetrical, the teeth may permit movement of the joint surfaces relative to one another in both opposite rotational or translational displacement directions of the joint. If asymmetrical, the teeth of the joint surfaces may collectively form a ratchet that selectively permits movement of the joint surfaces in only one of two opposite rotational or displacement directions of the joint. In some examples, the joint surfaces may define surface features that are not complementary to each other, and the surface features may deform, particularly when the joint is compressed.

One of both joint surfaces of a joint may be formed at least partially by a one-piece body of one of the plate members. The body also may define one or more through-holes to receive fasteners. In some examples, a joint surface may be formed by the body of one of the plate members and at least one deformable element 98 (also called an anti-slip element) associated with the body. The deformable element may be softer than the body of both plate members and may be deformed selectively by contact with the other joint surface. For example, the deformable element may be formed of polymer and each body of metal, or the deformable element may be formed of a softer metal and each body of a harder metal, among others. In any event, the deformable element may deform when the joint is compressed, to resist slippage of the plate members relative to one another.

Surface features of at least one of the joint surfaces may facilitate deformation of the deformable element. For example, one or more of the surface features (e.g., one or more ridges) may form or deepen one or more indentations in the deformable element when the joint is compressed. The deformable element may be disposed at least partially in a recess formed in one of the joint surfaces and may project out of the recess toward the other joint surface, for contact therewith. The deformable element may be an insert that is formed separately and then attached to one of the plate member bodies, or the deformable element may be formed in contact with one of the bodies, such as by overmolding or otherwise applying a material to the body to create the deformable element. The deformable element alternatively may be considered to be distinct from the plate member. Accordingly, the deformable element may be firmly attached to one of the plate members of a joint and movable with respect to the other plate member of the joint.

The bone plate 80 may include a discrete connector 100 that connects the plate members to one another at the joint. The connector may be described as a locking member (which may in some examples, be described as a fastener and/or a lock screw) that controls whether the joint 82 is in a movable configuration or a fixed (locked) configuration. The terms "movable" and "fixed" may be relative terms.

A fixed configuration may require substantially more force to produce movement of plate members relative to one another, such as at least about 5, 10, 25, 50, or 100 times as much force, among others. In the fixed configuration, the bone plate may become rigid at the joint, with the plate members rigidly coupled to one another, so that the bone plate can function like a traditional (non-jointed) bone plate.

The connector may extend from one plate member to another plate member through the joint surfaces of the plate members. For example, the connector may define a pivot axis of the joint (i.e., may be coaxial to the pivot axis) or may be offset from the pivot axis. Each plate member may define an aperture to receive a portion of the connector.

In some examples, the connector may have an external thread for attaching the connector to one of the plate members at an aperture thereof. The connector may be rotatable to adjust a compression of the plate members at the joint, thereby determining whether the joint is fixed or movable. In some indications, the joint may not lockable, for example, where the deforming forces act in a different plane than the adjustment capability, such as for clavicle fixation. Movement at the locked joint may be restricted by any suitable mechanism including any combination of friction, obstruction, interfitment, or the like.

FIGS. 2-6 show an exemplary bone plate 120 having a pair of hinge joints 122a, 122b arranged along the long axis of the bone plate and permanently connecting plate members 124, 126, and 128 to one another. (The plate member 126 is a central plate member, and the plate members 124 and 128 are end plate members.) Each hinge joint may resist out-of-plane bending and torsional forces, while permitting movement, indicated at 130 in FIG. 2, about a single pivot axis arranged transverse (e.g., orthogonal) to a plane defined by the bone plate and/or at least one plate member of the hinge joint. This pivotal movement permits adjustment of the longitudinal shape of the bone plate by in-plane motion of the plate members, to allow a surgeon to customize the bone plate to the longitudinal shape of a subject's bone. In some examples, the bone plate 120 may have only two plate members connected by a single hinge joint (or four or more plate members connected by three or more joints). The bone plate 120 may be used to fix a clavicle or any other suitable bone, such as a femur, tibia, fibula, radius, ulna, humerus, rib, or the like.

Figure 2:
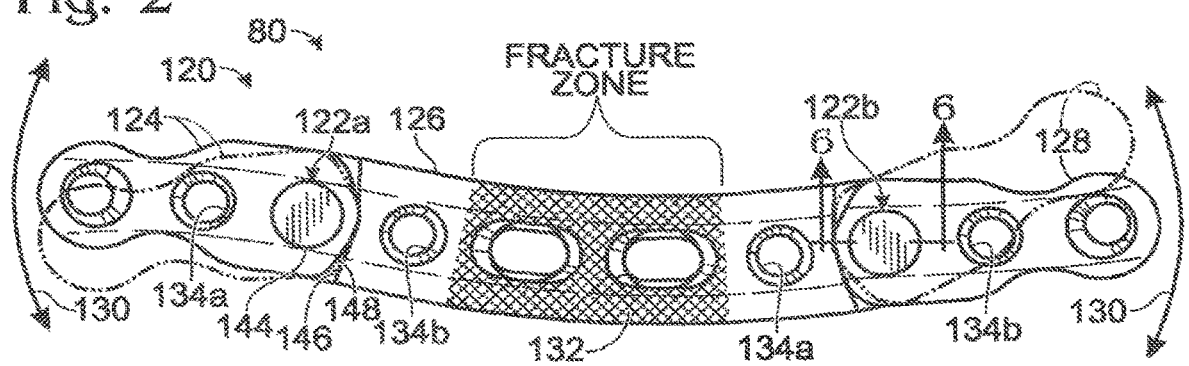
FIG. 2 is a plan view of an exemplary bone plate for fixation of a clavicle and having a pair of rotatable joints spaced along the bone plate from one another, with each joint being a hinge joint that is movable about a rotation axis arranged transverse to a plane defined by the bone plate, to allow adjustment of the longitudinal shape of the bone plate, in accordance with aspects of the present disclosure.
Figure 3:
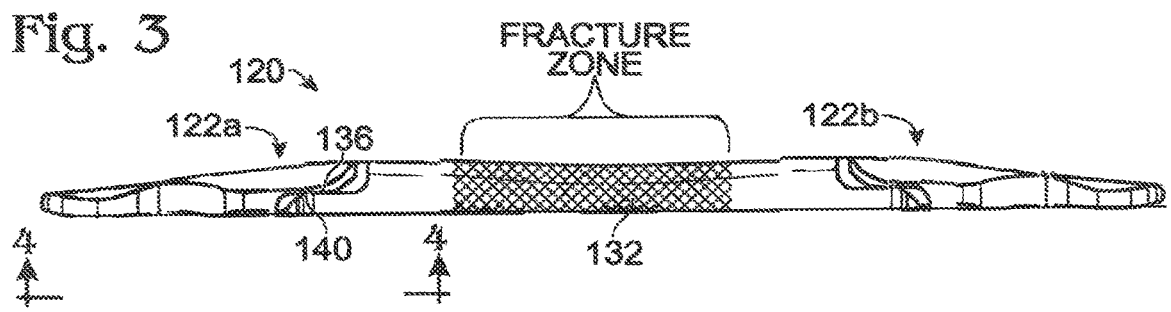
FIG. 3 is a lateral view of the bone plate of FIG. 2.
Figure 4:
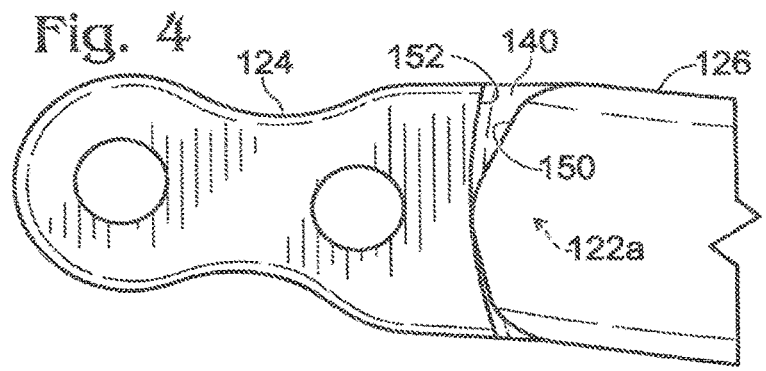
FIG. 4 is a bottom, fragmentary view of an end portion of the bone plate of FIG. 2, taken generally along line 4-4 of FIG. 3.
Figure 5:
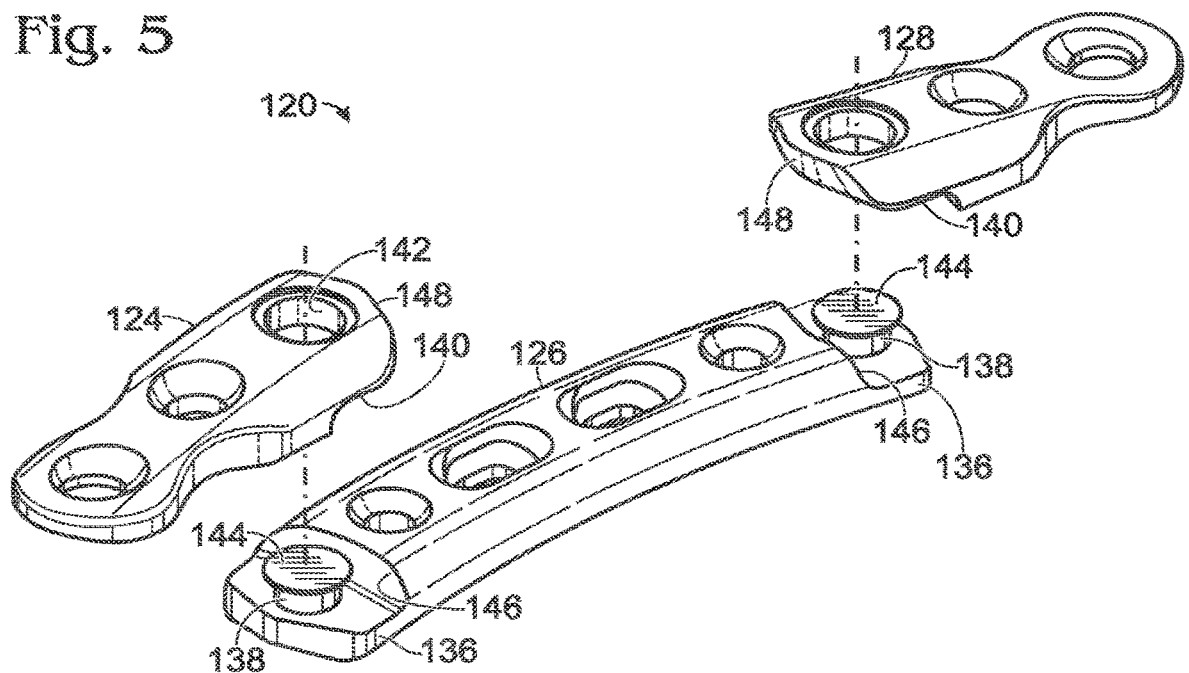
FIG. 5 is an exploded view of the bone plate of FIG. 2 showing the three segments (plate members) of the bone plate that are attached to one another by hinge joints.
Figure 6:
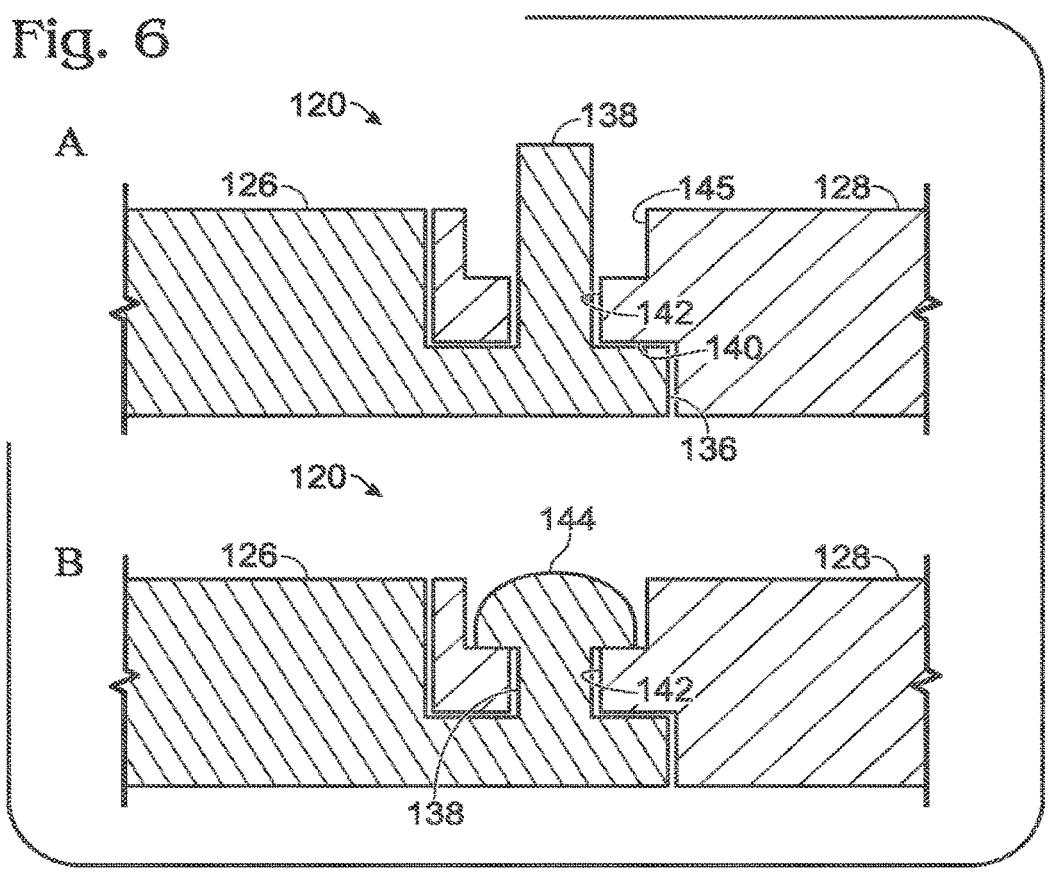
FIG. 6 is a schematic sectional view of the bone plate of FIG. 2, taken generally along line 6-6 of FIG. 2 through one of the hinge joints of the bone plate before (panel A) and after (panel B) an axle of the joint is deformed to capture another plate member of the bone plate on the axle, in accordance with aspects of the present disclosure.

The bone plate 120 may be marked with one or more surface markings 132, to define a longitudinal region of the bone plate that should overlie the fractured or cut portion of the bone to be fixed (the "fracture zone") (see FIGS. 2 and 3). The surface marking may be formed by etching, machining, molding, coating, electrolyzing, etc., the bone plate at the region to be marked, to make the region or boundaries thereof visibly distinguishable. In some examples, the marked region may have a different color than other parts of the bone plate. In any event, the central plate member 126 may be positioned on a bone to longitudinally span the fractured or cut portion of the bone. However, in some examples, the bone plate 120 can be positioned on a fractured bone with a fracture of the bone overlapping end plate member 124 or 128, one of the hinge joints 122a or 122b, and/or a region of the central plate member 126 outside the marked region of the bone plate.

In the depicted embodiment, each hinge joint lacks the ability to be adjustably compressed along the pivot axis, to change the hinge joint between movable and fixed configurations. Instead, rotational movement at each joint may be restricted by securing the bone plate to an unbroken (continuous) portion of bone with a pair of fasteners placed into the unbroken portion on opposite sides of each hinge joint, such that the unbroken portion extends from one of the fasteners to the other fastener of the pair. In some examples, the hinge joint may be located between a pair of through-holes 134a, 134b having attachment structure for the fasteners (such as an internal thread), to rigidly attach each fastener to the bone plate. In any event, bone plate 120 may permit at least two or three fasteners to be placed into unbroken bone on each side of the fracture zone.

The hinge joint may be formed as a movable, half lap joint; see FIGS. 3-6. Central plate member 126 may form a tab 136 of reduced thickness at each of its ends. An axle 138 (interchangeably termed a protrusion or a post) may project orthogonally from the tab. Each end plate member 124, 128 may define an undercut region 140 at one of its ends. The end plate member may define an aperture 142 sized to receive the axle (e.g., sized slightly larger in diameter than the axle), while undercut region 140 may be sized to receive tab 136 without increasing the thickness of the bone plate. The end of axle 138 may be deformed (e.g., swaged) (see panels A and B of FIG. 6) to form a retainer or head 144 that captures one of the end plate members on the axle, to prevent the plate members from being disconnected from one another without damaging the bone plate. The retainer 144 may occupy a widened region 145 of aperture 142.

In some examples, the height of each of the tab 136, aperture 142 excluding widened region 145, and widened region 145 may be about one-third of the overall height (thickness) of the bone plate at the hinge joint. The retainer 144 may protrude from the top surface of a plate member, or the retainer 144 may be flush or recessed with respect to the top surface. In some examples, the retainer 144 may be welded to the axle. In some examples, the entire bone plate (including the hinge joint) may be produced by 3D printing, optionally followed by deformation at the hinge joint (e.g., at the retainer) to increase the frictional resistance to rotation of the plate members. In some examples, the retainer 144 may be formed by a discrete element, such as a nut attached to a threaded version of the axle, among others. In some examples, aspects of the hinge joint may be reversed. For example, the central plate member 126 may form an undercut region that overlies a tab formed by an end plate member at the hinge joint, and/or an end plate member may provide the axle.

The axle may have any suitable properties. The axle may or may not be elongated along the pivot axis. The axle may be cylindrical or at least may have a cylindrical portion disposed in the aperture of the other plate member. The axle may have a through-hole that is pre-formed before the axle is placed into the aperture, or the through-hole may be formed after the retainer is created, among others. In some examples, the through-hole may be pre-formed and then modified after the retainer has been created. Modification of the through-hole may include creating an internal thread in the through-hole, and/or revising the through-hole to remove distortion, if any, produced when the retainer is created.

Each hinge joint 122a, 122b may have a frictional resistance that is not adjustable at the joint by the user (e.g., a surgeon). In other words, the hinge joints may not be configured to be adjustable off bone between a movable configuration and a fixed configuration. The frictional resistance may be set during manufacture of the bone plate by tightly engaging the retainer 144 with one of the plate members, such as a wall region of the aperture 142 and/or an outer surface of the plate member. A bone plate having a hinge joint that lacks distinct movable and fixed configurations (and, optionally, has no discrete connector) can make the bone plate easier and faster to install, less likely to experience a mechanical malfunction or failure (e.g., caused by a discrete connector becoming loose over time), and more resistant to accidental disassembly.

The range of motion at each hinge joint may be determined by contact between stop regions 146 and 148 (see FIGS. 2 and 5) and/or stop regions 150 and 152 (see FIG. 4), which may be formed by vertical walls of central plate member 126 and an end plate member 124 or 128. The hinge joint may have any suitable range of angular motion, such as at least about 5 or 10 degrees, and/or less than about 45, 30, or 20 degrees, among others.

Figure 7:
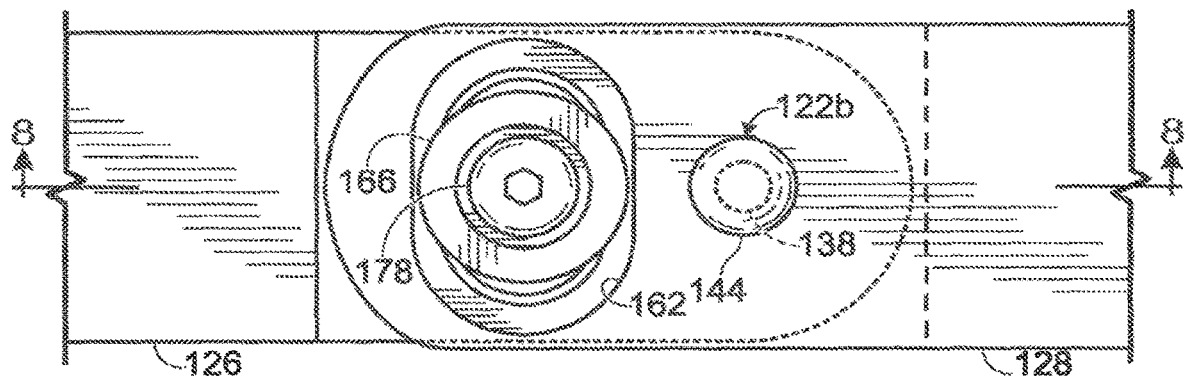
FIG. 7 is a fragmentary plan view of an exemplary bone plate having a hinge joint that is lockable with a locking member located at a position spaced from the pivot axis of the hinge joint, in accordance with aspects of the present disclosure.
Figure 8:
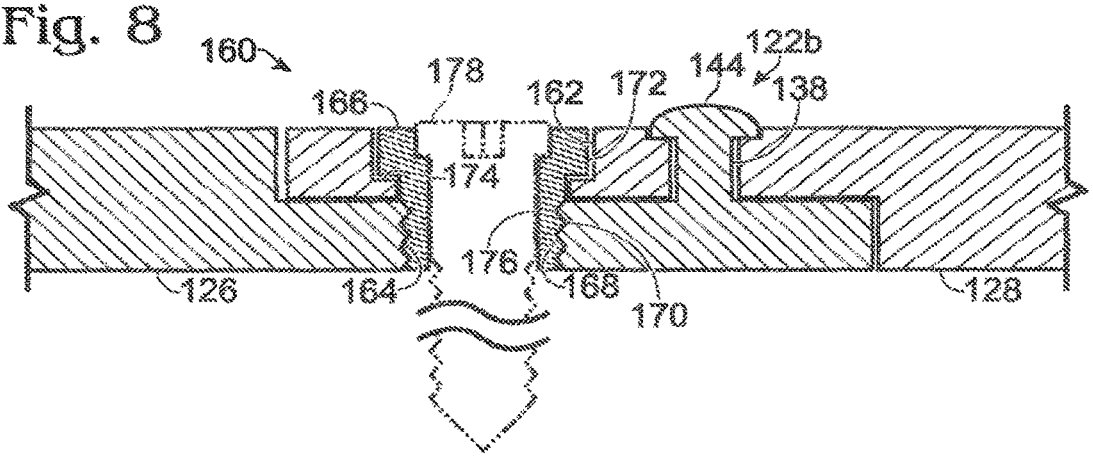
FIG. 8 is a longitudinal sectional view of the bone plate of FIG. 7, taken generally along line 8-8 of FIG. 7 through the hinge joint and the locking member.

FIGS. 7 and 8 show a bone plate 160 that is a version of a bone plate 120 having a hinge joint 122b that can be locked off bone. Overlapped regions of central plate member 126 and end plate member 128 may define a pair of aligned apertures 162, 164 to receive a fastener that functions as a locking member 166. The locking member may be a set screw. The upper aperture 162 may be elongated transverse to the long axis of the bone plate (and elongated in the plane of the bone plate), to form a slot. The lower aperture 164 may have an internal thread 168.

The locking member 166 may have an external thread 170 to attach the locking member to the plate member 126 at the lower aperture 164. A head 172 of the locking member may be disposed in a wider, top region of the upper aperture 162 and moves along the long axis of the upper aperture 162 as the plate members of the bone plate are pivoted relative to one another at the hinge joint 122b. The underside of the head 172 may be tightened against a wall region 174 of the upper aperture 162, to urge the plate member 128 into tight engagement with the plate member 126, to fix the angular orientation of the plate members relative to each other at a selected rotational position. The locking member 166 may define a central through-hole 176 to receive a fastener, such as a bone screw 178, that extends into bone.

Figure 9:
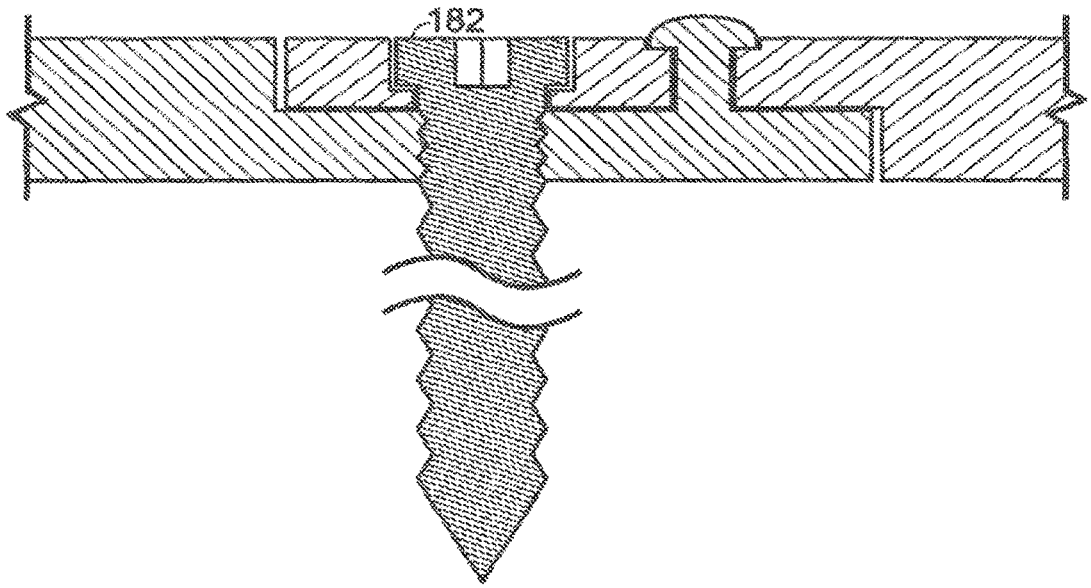
FIG. 9 a longitudinal sectional view taken as in FIG. 8 with the hinge joint locked with a different locking member.

FIG. 9 shows a bone plate 160 locked with a different locking member 182 that is not cannulated and is configured to extend below the bone plate into bone. In other examples, non-cannulated locking member 182 may not extend substantially below the inner surface of the bone plate.

FIGS. 10 and 11 show an exemplary bone plate 200 having a hinge joint 202 locked with a connector 204. Plate members 206, 208 of the bone plate are fitted together via a pair of arcuate, complementary mating regions 210, 212 centered around and a bracketing pivot axis 214 of the hinge joint 202.

Each complementary region 210, 212 may include a mating feature. For example the complementary region may include a track 216 defined as an arcuate channel, and an end region, such as a flange 218, that fits into and is complementary to the track (see FIG. 11). Each track 216 may have an undercut region 220 that retains the flange in the track and resists separating movement of the plate members 206, 208 from one another in opposite directions parallel to the pivot axis 214. More generally, the complementary mating features prevent translational disassembly of the mated plate members. However, each flange 218 can slide in-plane in the track as the plate members 206, 208 are pivoted relative to one another about the pivot axis 214.

The plate members can be mated with one another initially by placing each flange 218 in its corresponding track, with the plate members arranged obliquely to one another (e.g., at an angle of at least about 20, 40, or 60 degrees from coaxial to one another, among others). The plate members then may be rotationally mated with one another by pivoting the plate members toward coaxial alignment with one another. The plate members will remain connected to one another in this mated configuration unless they are pivoted far enough out of alignment to remove each flange from its corresponding track. In some examples, the hinge joint may have only one flange and one track formed on only one side of pivot axis 214. In some examples, one of the plate members at the hinge joint may form flanges on opposite sides of the pivot axis, and the other plate member may define both tracks for receiving both flanges.

The plate members 206, 208 may define a pair of aligned apertures 222, 224 to receive a connector 204. The connector may attach to the lower aperture 224 by threaded engagement, to ensure that the plate members cannot be inadvertently disconnected from one another. The connector also may function as a lag screw, with a head that can be tightened against the upper plate member near the hinge joint to create tight engagement of the plate members with one another to lock the hinge joint at a selected position. The connector 204 optionally may include a threaded leading region 226 configured to project below the bone plate and into underlying bone.

Figure 12:
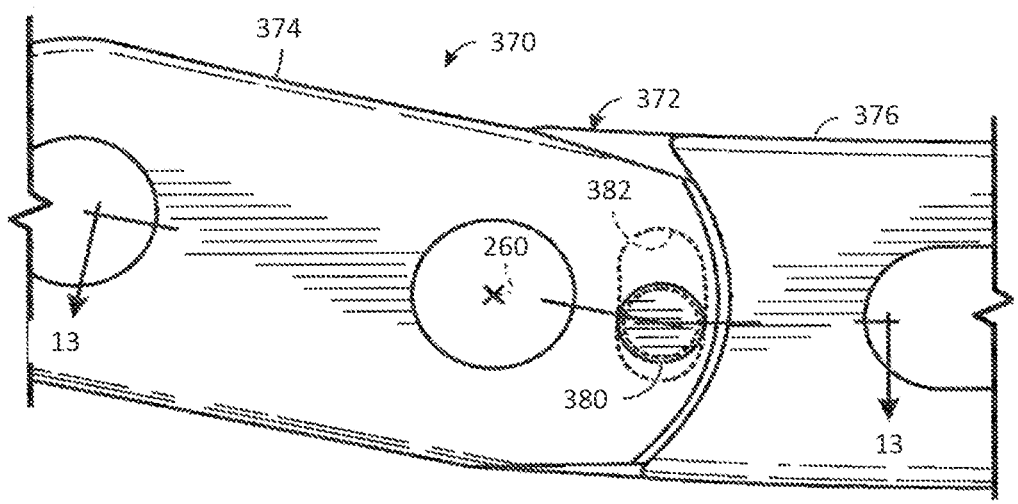
FIG. 12 is a fragmentary bottom view of a bone plate having a hinge joint with a range of pivotal motion determined by a pin received in a slot, with the range of pivotal motion preventing rotational disassembly of mated plate members of the hinge joint such that the plate members are permanently connected to one another according to an example of the present disclosure.
Figure 13:
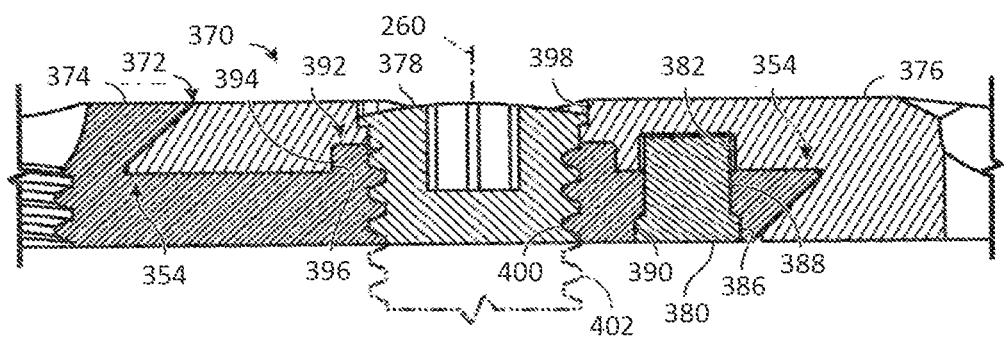
FIG. 13 is a fragmentary sectional view of the bone plate of FIG. 12, taken generally along line 13-13 of FIG. 12 through the joint after installation of a connector in a pair of aligned apertures defined by the plate members according to an example of the present disclosure.

FIGS. 12 and 13 show another exemplary bone plate 370 having a hinge joint 372 formed by a pair of the plate members 374, 376 and a connector 378. (The connector 378 is illustrated only in FIG. 13.) The bone plate may have any suitable combination of the features of the present disclosure.

The plate members 374, 376 may be permanently connected to one another with a pin 380, whether or not the connector 378 is installed. The pin 380 may be attached to one of the plate members (e.g., rigidly coupled to the plate member 374) and extend into an arcuate slot 382 defined by the other plate member (e.g., plate member 376). The pin may travel along the slot as the plate members are pivoted relative to another about a pivot axis 260, and is stopped by opposite ends of the slot, to define a range of rotation for the plate members about the pivot axis. The pin may extend into the bone plate from a position near the inner surface (or the outer surface) of the bone plate.

The pin 380 may have a head 386 and a shaft 388. The pin may be attached to the plate member 374 via the head 386, and the shaft 388 may extend into the slot 382. In some examples, the pin may be press-fitted into an opening 390 defined by the plate member 374 to attach the pin to the plate member.

The plate members may have various mating features. The mating features may include complementary rotational mating features 354 formed by the plate members 374 and 376 at the hinge joint 372. The mating features also or alternatively may include complementary mating features 392 that cooperate with the pin 380 to permanently connect the plate members to one another. The mating features 392 may include a protrusion, such as a boss 394, received in a complementary recess 396. The boss and recess both may be coaxial to the pivot axis 260.

The plate members may be assembled with one another as follows. The plate members may be translationally mated with one another along the pivot axis 260 by placing the boss 394 into the recess 396. Translational mating may be performed with the plate members 374 and 376 at an angle to one another at which the complementary mating features 354 are not yet mated with one another. In other words, the mating features 354 are not yet overlapping because they are rotationally offset from one another. The angle may for example, be at least 30 or 45 degrees from coaxial alignment of the plate members with one another.

The plate members then may be rotationally mated with one another by rotating the plate members relative to one another about the pivot axis 260 toward coaxial alignment, such that complementary mating features 354 are mated with one another. The mating features 354 are considered mated when least a portion of each male region is received in each corresponding track.

The plate members may be rotationally adjusted, while remaining mated, such that the opening 390 may be aligned with the slot 382. The pin 380 then may be placed into the opening 390, to attach the pin to the plate member 374, with the shaft of the pin extending into the slot 382 of the plate member 376. The plate members now are permanently connected to one another and are pivotable about the pivot axis 260 through a range of rotation determined by the pin in the slot. This arrangement is advantageous because a discrete connector (besides the pin) is not required to keep the plate members connected, and because the range of motion can be determined inside the bone plate without affecting the external geometry of the bone plate.

The connector 378 may be installed in aligned apertures 398, 400 defined by the plate members at any suitable time. The connector may be placed through the aperture 398 and into threaded engagement with the aperture 400 before or after the pin 380 is installed. The connector 378 can be manipulated to adjust the hinge joint 372 between movable and fixed configurations, as described elsewhere herein. In some examples, the bone plate 370 may be supplied to a user (e.g., a surgeon) with the connector 378 already installed, and, optionally, with the hinge joint 372 in a fixed configuration (e.g., with the plate members coaxially aligned with one another). The orientation of the plate members relative to one another may be adjusted via the hinge joint (in a movable configuration), and the plate members may be attached to bone with fasteners.

The connector 378 may be replaced with a corresponding fastener 402 that has a longer shaft than the connector and is configured to extend into bone after the bone plate has been placed on and/or attached to the bone. The fastener 402 may be disposed in threaded engagement with the plate member 374 and may be adjustable to place the hinge joint in a fixed configuration, with the fastener extending into bone. In other examples, the connector 378 may be cannulated to define a through-hole with or without an internal thread. In these examples, a fastener may be placed into bone from the through-hole along the pivot axis 260, while the connector 378 remains attached to the plate member 374.

In some examples, a method of fixing bone using any of the bone plates disclosed herein is provided. The steps presented herein may be performed in any suitable order and combination, and may be modified by or combined with any of the other procedures and features disclosed elsewhere herein.

At least one bone to be fixed may be selected. The bone(s) may be any suitable bone(s) of a vertebrate species, such as an arm bone (e.g., a humerus, ulna, or radius), a leg bone (e.g., a femur, tibia, or fibula), a hand/wrist bone (e.g., a carpal, metacarpal, or phalange), a foot/ankle bone (e.g., a tarsal, metatarsal, calcaneus, or phalange), a rib, a sternum, a scapula, a clavicle, a pelvis, a cranial bone, a facial bone, a vertebra, or the like, or any combination thereof of adjacent bones. The bone may have any suitable discontinuity or structural weakness, such as at least one fracture, at least one cut, a nonunion, or the like, or two or more adjacent bones may be selected to be fused to one another.

An incision may be created through overlying soft tissue to access the selected at least one bone. The selected bone may be manipulated to reposition bone fragments (e.g., to approximate the relative anatomical location of the fragments), such as to set a fracture. Manipulation of bone fragments (or two or more selected bones) may be performed before or after the incision is created.

A bone plate may be selected for stabilizing the selected bone. The bone plate may have at least two plate members connected by at least one movable joint as disclosed herein.

The bone plate may be placed through the incision and onto the selected bone. The incision may be at least about as long as or shorter than the bone plate.

The bone plate may be attached to the bone with fasteners, such as bone screws, placed into one or more through-holes of each plate member and extending into the bone.

The rotational and/or translational position of the plate members relative to one another may be adjusted before and/or after the bone plate is attached to the bone. Adjustment may be performed with a joint of the bone plate in a movable configuration that permits movement of the plate members relative to one another. The bone plate may be placed in a fixed configuration after the adjustment, to fix the positions of the plate members relative to one another. The incision then may be closed.

Bone plates with single-axis or multi-axis joints may be adjusted at different times during a bone fixation procedure. The longitudinal shape of a hinged bone plate having one or more hinge joints may be adjusted fully before the bone plate is attached to the bone, or at least before each plate member is attached to the bone. In some cases, the orientation of first and second plate members connected by a hinge joint may be adjusted after attaching the first plate member to bone and before attaching the second plate member to bone. The second plate member may be rotated relative to the first plate member, to a desired orientation, and then the second plate member may be attached to the bone. If the hinged bone plate has three or more plate members, this process may be performed again for each additional plate member before the plate member is attached to the bone. In other words, the plate members of the hinged bone plate may be successively aligned with the bone and then attached. The orientation of plate members of a bone plate having a multi-axis joint may be adjusted after the plate members are attached to different pieces of bone, to change the orientation of the pieces of bone (e.g., to improve fracture reduction).

Alternative or additional example systems, devices, and/or methods for fixing bone are disclosed in U.S. patent application Ser. No. 17/464,108, titled BONE PLATE WITH MOVABLE JOINT, filed Sep. 1, 2021, the disclosure of which is hereby incorporated by reference in its entirety. U.S. patent application Ser. No. 17/464,108 is a continuation of U.S. patent application Ser. No. 16/140,362, filed Sep. 24, 2018, which is a continuation-in-part of the following U.S. patent application Ser. No. 14/746,722, filed Jun. 22, 2015; U.S. patent application Ser. No. 14/792,522, filed Jul. 6, 2015; U.S. patent application Ser. No. 15/216,646, filed Jul. 21, 2016, now U.S. Pat. No. 10,080,596; U.S. patent application Ser. No. 15/990,633, filed May 26, 2018; and U.S. patent application Ser. No. 16/001,867, filed Jun. 6, 2018.

U.S. patent application Ser. No. 14/746,722, in turn, is based upon and claims the benefit under 35 U.S.C. § 119(e) of U.S. Provisional Patent Application No. 62/016,883, filed Jun. 25, 2014. U.S. patent application Ser. No. 14/792,522, in turn, is based upon and claims the benefit under 35 U.S.C. § 119(e) of U.S. Provisional Patent Application No. 62/020,691, filed Jul. 3, 2014; and U.S. Provisional Patent Application No. 62/110,220, filed Jan. 30, 2015. U.S. patent application Ser. No. 15/216,646, in turn, is a continuation-in-part of the following U.S. patent applications: U.S. patent application Ser. No. 14/565,105, filed Dec. 9, 2014, now U.S. Pat. No. 9,463,055; U.S. patent application Ser. No. 14/565,116, filed Dec. 9, 2014, now U.S. Pat. No. 9,433,448; U.S. patent application Ser. No. 14/566,350, filed Dec. 10, 2014, now U.S. Pat. No. 9,433,451; and U.S. patent application Ser. No. 14/706,922, filed May 7, 2015, now U.S. Pat. No. 9,526,542.

U.S. patent application Ser. No. 14/565,105, in turn, is based upon and claims the benefit under 35 U.S.C. § 119(e) of U.S. Provisional Patent Application No. 61/913,593, filed Dec. 9, 2013. U.S. patent application Ser. No. 14/565,116, in turn, is based upon and claims the benefit under 35 U.S.C. § 119(e) of U.S. Provisional Patent Application No. 61/913,611, filed Dec. 9, 2013. U.S. patent application Ser. No. 14/566,350, in turn, is a continuation-in-part of U.S. patent application Ser. No. 14/565,105, filed Dec. 9, 2014 and U.S. patent application Ser. No. 14/565,116, filed Dec. 9, 2014, with priority claims as listed above, and is based upon and claims the benefit under 35 U.S.C. § 119(e) of U.S. Provisional Patent Application No. 61/914,180, filed Dec. 10, 2013. U.S. patent application Ser. No. 14/706,922, in turn, is based upon and claims the benefit under 35 U.S.C. § 119(e) of U.S. Provisional Patent Application No. 61/989,662, filed May 7, 2014.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

Figure 14:
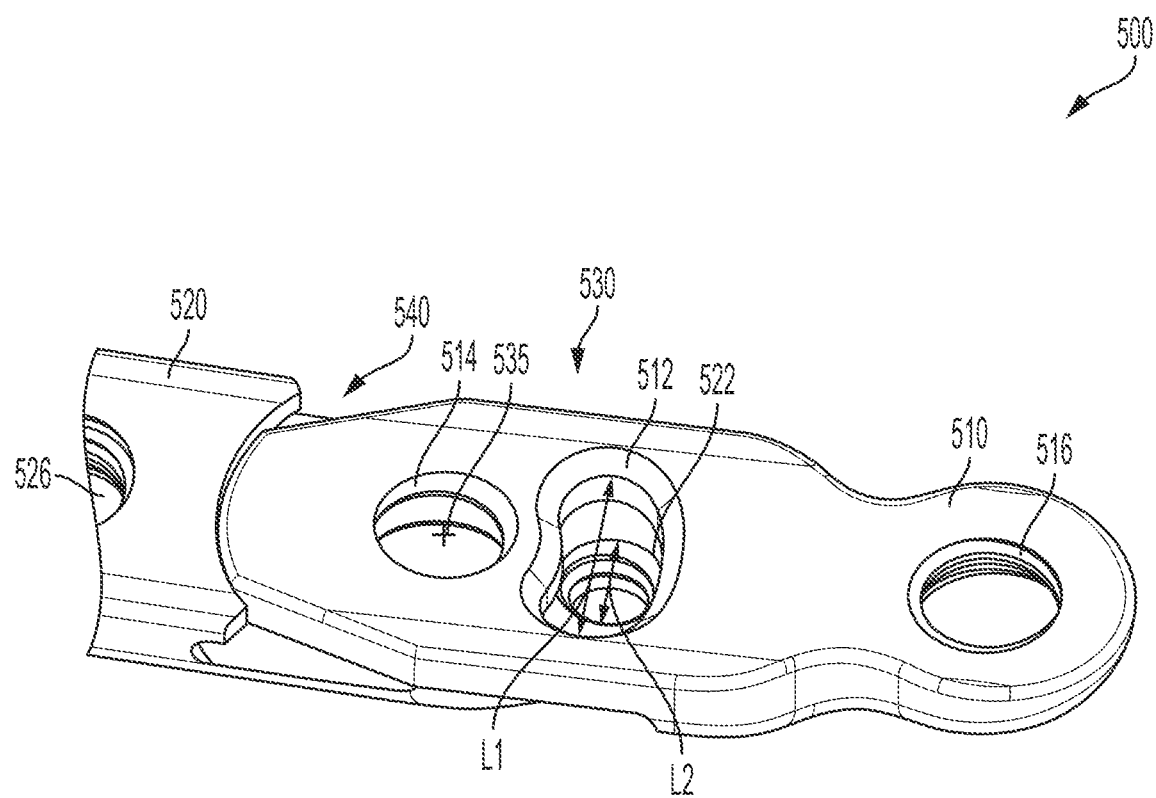
FIG. 14 is a schematic view of an exemplary apparatus for fixing bone according to an example of the present disclosure.
Figure 15:
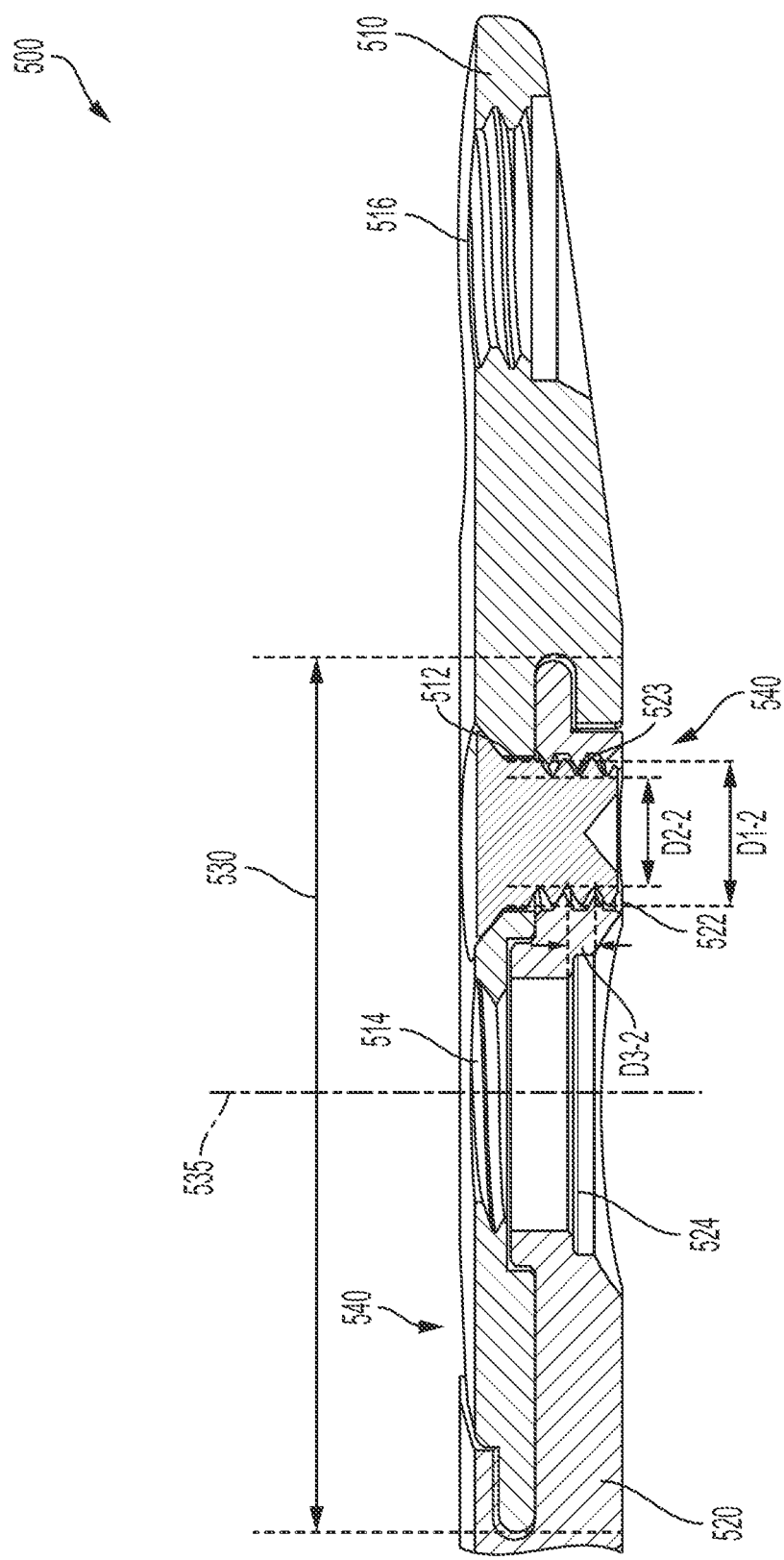
FIG. 15 is a cross-sectional view of the apparatus of FIG. 14.

FIGS. 14 and 15 illustrate an exemplary apparatus 500 (e.g., bone plate) for fixing bone according to an example of the present disclosure. The apparatus 500 may include a first plate 510 and a second plate 520. The first and second plates 510, 520 may be mounted to a bone (e.g., bone 88) using one or more fasteners (e.g., bone screws, pins, wires, rivets, etc.). In some examples, the apparatus 500 may be used to fix a clavicle or any other suitable bone, such as a femur, tibia, fibula, radius, ulna, humerus, rib, or the like.

The first plate 510 may include one or more openings 512, 514, 516. The one or more openings may include a screw slot 512, a connector hole 514, and a bone fastener hole 516. The screw slot 512 may be formed throughout the thickness of the first plate 510.

The second plate 520 may be coupled to the first plate 510 in a region of overlap 530, for example, by a hinge joint 540. The first and second plates 510, 520 may be movable relative to one another in at least one plane and/or about at least one rotation axis to change the angular orientation of the plates relative to one another. The hinge joint 540 may be configured to allow a rotation of the first and second plates 510, 520 relative to one another about a pivot axis 535. The rotation of the first and second plates 510, 520 relative to one another may occur in a plane that is at least generally parallel to a plane defined by the first plate 510 and/or the second plate 520.

The hinge joint 540 may resist out-of-plane bending and torsional forces, while permitting movement about a pivot axis 535 arranged transverse (e.g., orthogonal) to a plane defined by the apparatus 500 and/or at least one plate 510/520. This pivotal movement may permit adjustment of the longitudinal shape of the apparatus 500 by in-plane motion of the plates 510, 520, to allow a surgeon to customize the apparatus 500 to the longitudinal shape of a subject's bone.

The second plate 520 may include one or more openings. The one or more openings may include a through hole 522, a connector hole 524, and a bone fastener hole 526. The through hole 522 of the second plate 520 may correspond to the screw slot 512 of the first plate 510. The screw slot 512 of the first plate 510 and the through hole 522 of the second plate 520 may be disposed in the region 530 where the first plate 510 overlaps with the second plate 520. The through hole 522 may include internal threads 523.

In some examples, the first plate 510 and/or the second plate 520 may be in an elongated bar shape. In other examples, the first plate 510 and/or the second plate 520 may have any other suitable shape. In some examples, the first plate 510 and/or the second plate 520 may be made with a metal material, for example, titanium. In other examples, the first plate 510 and/or the second plate 520 may be made with any other suitable biocompatible/implantable material (e.g., any other suitable metal material).

The bone fastener holes 516, 526 may be configured to receive a bone fastener. For example, one or more bone fasteners may be received in the bone fastener holes 516, 526 on the first and second plates 510, 520, and extend into the bone. Each of the first and second plates 510, 520 may have any suitable number of bone fastener holes. In some examples, if the first/second plate 510/520 has two or more bone fastener holes, the bone fastener holes may be distributed in a direction along and/or across the plate from one another.

The connector holes 514, 524 may be configured to receive a connector (e.g., connector 100, 204, 378). The connector may serve as a locking device (which may in some examples, be described as a fastener and/or a lock screw) that controls whether the joint is in a movable configuration or a fixed (locked) configuration. The terms "movable" and "fixed" may be relative terms. For example, a fixed configuration may require substantially more force (e.g., than a movable configuration) to produce movement of the plates 510/520 relative to one another, such as at least about 5, 10, 25, 50, or 100 times as much force. In the fixed configuration, the apparatus 500 may become rigid at the joint, with the plates 510, 520 rigidly coupled to one another, so that the apparatus 500 can function like a traditional (non-jointed) bone plate.

In some examples, the connector may define a pivot axis 535 of the joint (i.e., may be coaxial to the pivot axis 535) or may be offset from the pivot axis 535. The connector may have an external thread for attaching the connector to one of the plates 510, 520 at a connector hole 514/524 thereof. The connector may be rotatable to adjust a compression of the plates 510, 520 at the joint, thereby determining whether the joint is fixed or movable. Movement at the locked joint may be restricted by any suitable mechanism including any combination of friction, obstruction, interfitment, or the like.

In some examples, the connector of the apparatus 500 may be in the movable configuration. In other examples, the connector of the apparatus 500 may be in the fixed configuration. Other configurations/features/characteristics of the connector and the connector hole 514/524 may be similar to and/or same as the ones described above with respect to the connector 100, 204, 378 and corresponding connector holes/openings and, thus, duplicate description may be omitted.

In some examples, a length L1 of the screw slot 512 of the first plate 510 may be greater than a length L2 of the through hole 522 of the second plate 520. In some examples, the screw slot 512 may be curved. In other examples, the screw slot 512 may have any other suitable shape.

Figure 16C:
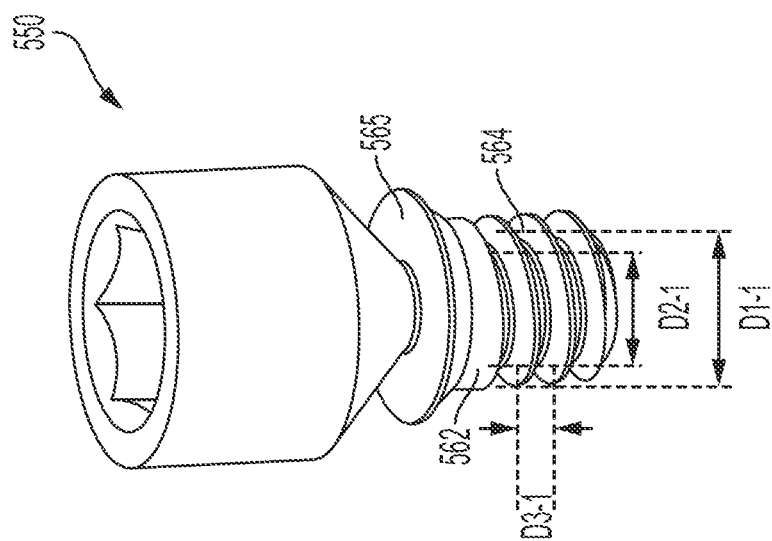
FIG. 16C is a schematic view of an exemplary screw body for an apparatus for fixing bone according to an example of the present disclosure.
Figure 16B:
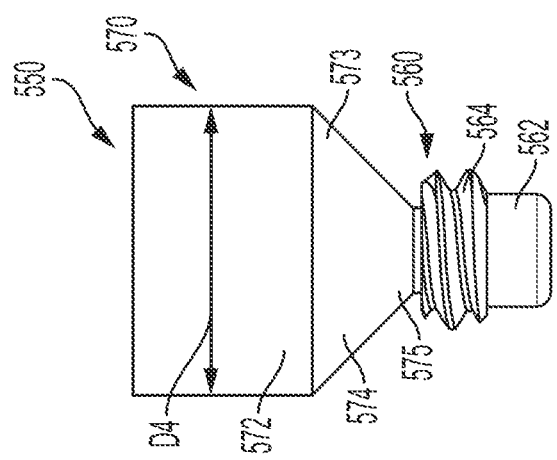
FIG. 16B is a schematic view of an exemplary screw body for an apparatus for fixing bone according to an example of the present disclosure.
Figure 16A:
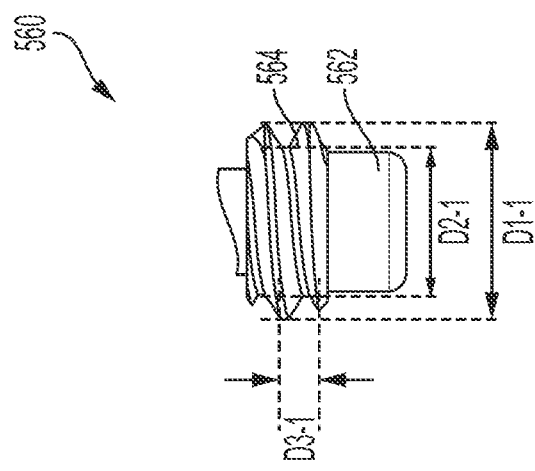
FIG. 16A is a schematic view of an exemplary screw for an apparatus for fixing bone according to an example of the present disclosure.

Referring to FIG. 16A, in some examples, the apparatus 500 may further include a screw 560 disposed in the screw slot 512 of the first plate 510 and the through hole 522 of the second plate 520. The screw 560 may include a non-threaded portion 562 and a threaded portion 564. The threaded portion 564 of the screw 560 may have a threaded engagement with the internal threads 523 of the through hole 522 of the second plate 520. The screw 560 may be fixed within the through hole 522 of the second plate 520, and may be movable within the screw slot 512 of the first plate 510. In the screw slot 512, the screw 560 may have a clearance fit with the sides of the screw slot 512.

In some examples, the screw 560 may be a set screw. In other examples, the screw 560 may be any other suitable device that functions as a screw. In some examples, the first and second plates 510, 520 may be permanently connected to one another with the screw 560, whether or not the connector is installed (in the connector holes 514, 524).

In some examples, the screw 560 may be tightened to create friction in the apparatus 500 (e.g., between the first plate 510 and the second plate 520). That is, torque applied to the screw 560 may dictate friction. For example, higher torque on the screw 560 may require increased force to rotate the first plate 510 relative to the second plate 520. In some examples, a torque may be applied to the screw 560 that is intended to dial in a rotational resistance that may allow the joint to be articulated with deliberate force by a user (e.g., a surgeon), but may prevent unintended articulation.

In some examples, the first plate 510, the second plate 520, and the screw 560 may define a range of rotation for the first and second plates 510, 520 about the pivot axis 535. For example, the screw 560 may travel along the screw slot 512 as the plates 510, 520 are pivoted relative to another about the pivot axis 535, and may be stopped by opposite ends of the screw slot 512, to define a range of rotation for the first and second plates 510, 520 about the pivot axis 535.

The first and second plates 510, 520 may have various (complementary) mating features, for example, mating features described above for the bone plates illustrated in FIGS. 1-13. Therefore, duplicate description of the mating features may be omitted.

Referring to FIG. 16B, in some examples, the screw 560 may be a part of the screw body 550, which may include a breakoff feature. The screw body 550 may include a screw portion (e.g., screw) 560 and an insertion portion 570. The insertion portion 570 may include a graspable portion 572 and a connecting portion 574 disposed between the graspable portion 572 and the screw portion 560. The connecting portion 574 may include a first end portion 573 adjacent the graspable portion 572 and a second end portion 575 adjacent the screw portion 560. In some examples, the connecting portion 574 may be tapered. In this case, the diameter of the connecting portion 574 may gradually increase from the second end portion 575 to the first end portion 573. The diameter D4 of the insertion portion 570 (e.g., graspable portion 572) may be greater than the diameter of the screw portion (e.g., D2-1 or D1-1). In this example, the threaded portion 564 may be disposed closer to the insertion portion 570 than the non-threaded portion 562.

In the present disclosure, the term "diameter" is used for simplicity, and there is no requirement that the component described using the term "diameter" has a circular shape. When the component is non-circular, the term "diameter" may instead refer to any similarly used measurement across the component (e.g., width), as will be understood by one of ordinary skill in the art.

FIG. 16C illustrates another example screw body 550 according to the present disclosure. In this example, the non-threaded portion 562 may be disposed closer to the insertion portion 570 than the threaded portion 564. In addition, the screw portion 560 may further include a head 565 having a diameter greater than the non-threaded portion 562 and the threaded portion 564. Other configurations/features/characteristics of the screw body 550 of FIG. 16C (e.g., components, dimension, shape) may be similar to and/or same as the ones described above with respect to the screw body 550 of FIG. 16B and, thus, duplicate description may be omitted.

In some examples, the screw 560 and/or the screw body 550 may be made with a polyether ether ketone (PEEK) material or a high molecular weight polyethylene (HMWPE) material. In other examples, the screw 560 and/or the screw body 550 may be made with any other suitable material (e.g., any other suitable plastic/polymer material having a characteristic similar to PEEK or HMWPE). The screw 560 made with the above-discussed material (e.g., PEEK or HMWPE) may provide a smoother bearing surface, which may create a smoother feel when articulating the plates 510, 520.

In some examples, the major diameter D1-1 of the screw 560 may be greater than a diameter D1-2 of a corresponding portion of the internal thread 523. In some examples, the minor diameter D2-1 of the screw 560 may be greater than a diameter D2-2 of a corresponding portion of the internal thread 523. In some examples, there is a pitch mismatch between the screw 560 and the internal thread 523. For example, the pitch D3-1 of the screw 560 may be different from (e.g., smaller or greater than) the distance D3-2 of a corresponding portion of the internal thread 523. Since a plastic is deformable, a screw made with a plastic material (e.g., PEEK or HMWPE) can have a different major diameter, minor diameter, and/or pitch than a corresponding portion of the internal threads 523 of the second plate 520. In this way, the screw 560 (e.g., threaded portion 564) may have an interference fit with the through hole 522 of the second plate 520, thereby preventing movement of the first and second plates 510, 520 relative to each other, for example, after a desired/targeted drag/friction is set unless a predetermined amount of force (e.g., deliberate force by a user's hand) is applied.

Figure 17:
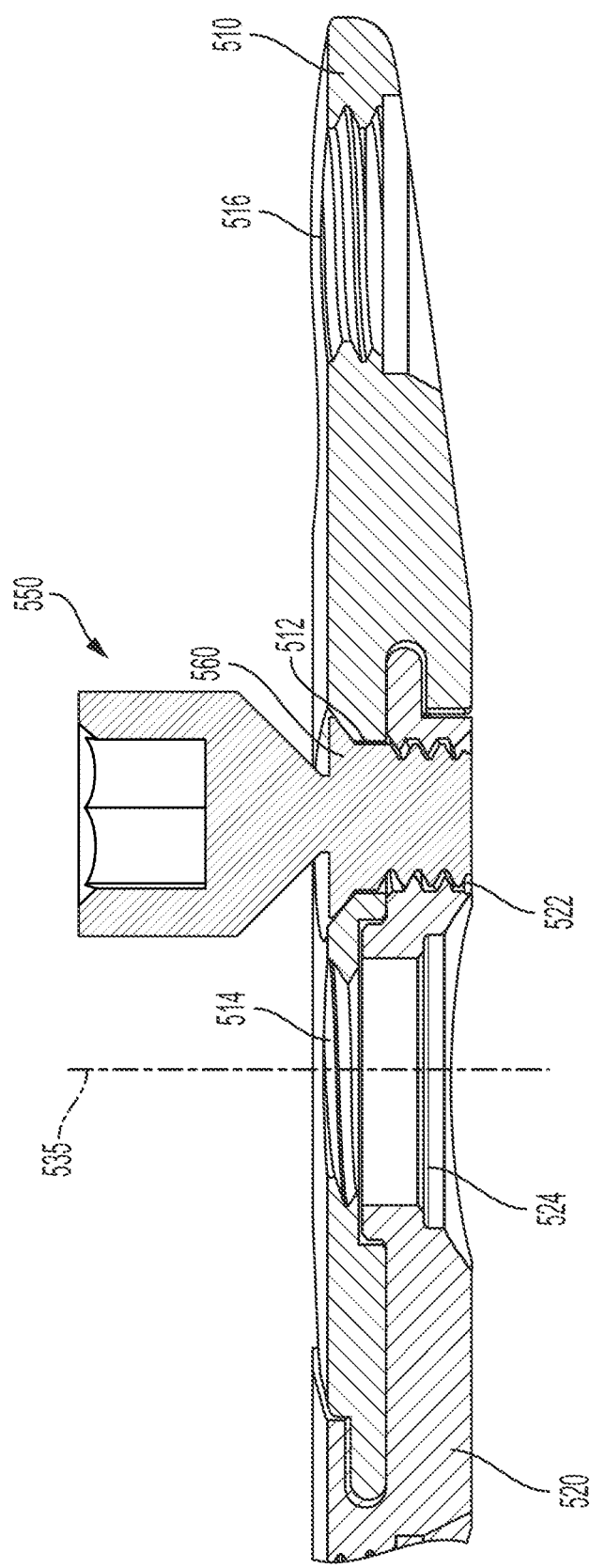
FIG. 17 is a cross-sectional view of the apparatus of FIG. 14 with a screw body installed therein.

FIG. 17 illustrates the exemplary apparatus 500 for fixing bone, where the screw body 550 (illustrated in FIG. 16C) is inserted into the screw slot 512 of the first plate 510 and the through hole 522 of the second plate 520. As shown in FIG. 17, the threaded portion 564 of the screw portion 560 may be engaged with the internal threads 523 of the through hole 522 of the second plate 520, and the non-threaded portion 562 and the head 565 of the screw portion 560 may be engaged with the screw slot 512 of the first plate 510.

When the screw 560 is made with a plastic material (e.g., PEEK), it might be difficult to install the screw 560 into the first and second plates 510, 520 using a driver because a driver receiving recess of a screw made with a plastic material can be easily broken or cracked and, thus, a sufficient torque to set desired/targeted drag/friction between plates 510, 520 cannot be applied to the screw. Therefore, the insertion portion 570 may be provided to ensure that the screw 560 has enough torsional strength (for installing the screw 560 into the screw slot 512 and the through hole 522) to achieve a desired torque to set desired drag/friction between the first and second plates 510, 520. For example, a targeted torque may be applied to the insertion portion 570 (e.g., graspable portion 572) by rotating the insertion portion 570, which may be transferred to the screw portion 560. In some examples, after the screw portion 560 is inserted into the screw slot 512 of the first plate 510 and the through hole 522 of the second plate 520, the insertion portion 570 may be removed. For example, once a desired drag/friction is set between the first and second plates 510, 520, the insertion portion 570 may be side loaded and broken off. In some examples, the cut surface of the screw portion 560 may include a protrusion and/or a depression after the insertion portion 570 is removed. In other examples, the cut surface of the screw portion 560 may be flat and/or smooth.

Figure 18:
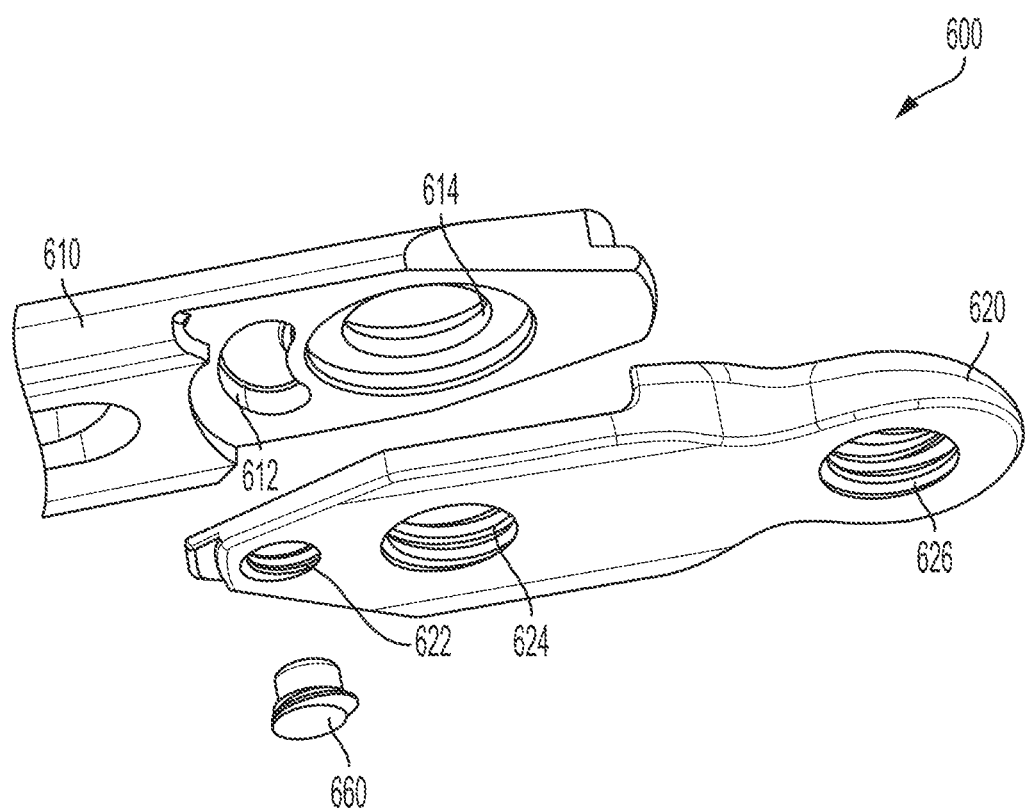
FIG. 18 is an exploded view of an exemplary apparatus for fixing bone according to an example of the present disclosure.
Figure 19:
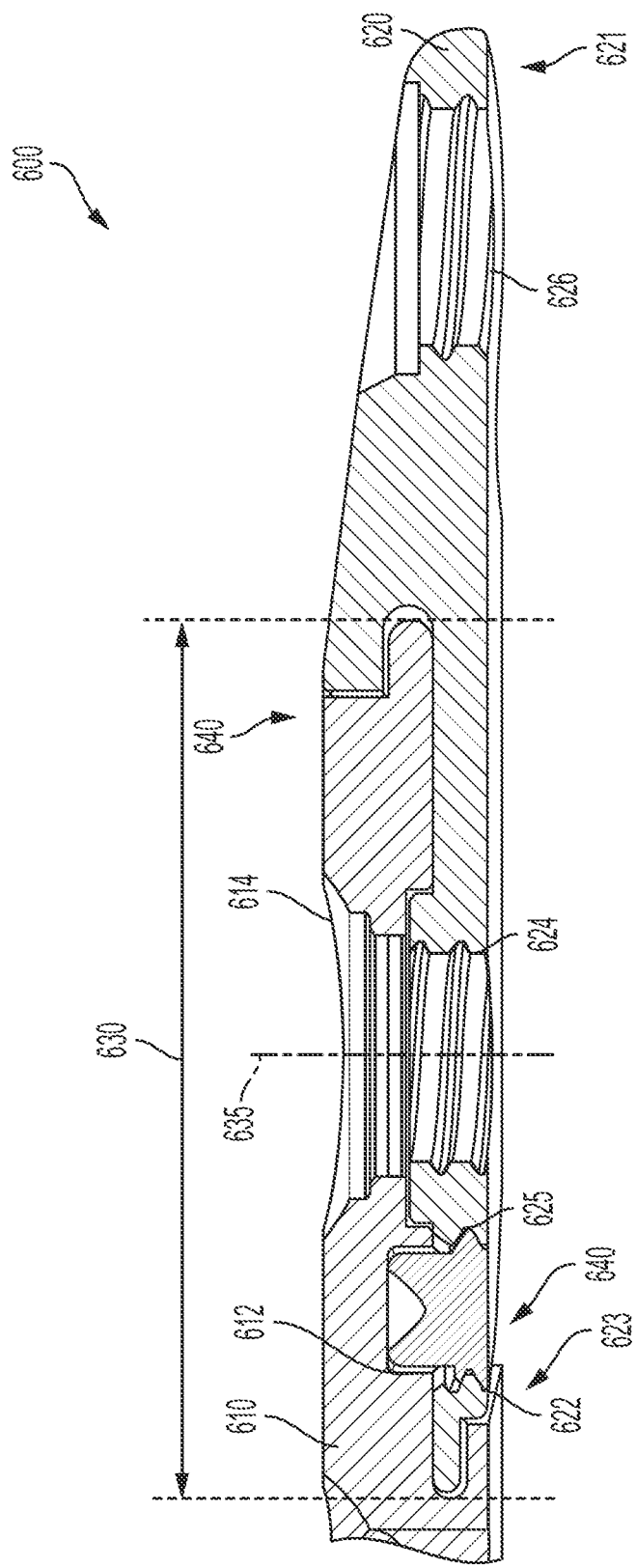
FIG. 19 is a cross-sectional view of the apparatus of FIG. 18.

FIGS. 18 and 19 illustrate another exemplary apparatus 600 (e.g., bone plate) for fixing bone according to an example of the present disclosure. The apparatus 600 may include a first plate 610 and a second plate 620. The first plate 610 may include one or more openings 612, 614. The one or more openings may include a screw slot 612, a connector hole 614, and a bone fastener hole.

The second plate 620 may be coupled to the first plate 610 in a region of overlap 630, for example, by a hinge joint 640. The hinge joint 640 may be configured to allow a rotation of the first and second plates 610, 620 relative to one another about a pivot axis 635. The second plate 620 may include one or more openings. The one or more openings may include a through hole 622, a connector hole 624, and a bone fastener hole 626. The through hole 622 of the second plate 620 may correspond to the screw slot 612 of the first plate 610. The screw slot 612 of the first plate 610 and the through hole 622 of the second plate 620 may be disposed in the region 630 where the first plate 610 overlaps with the second plate 620. The through hole 622 may include internal threads 625.

The screw slot 612 of the first plate 610 may be formed on a bottom surface of the first plate 610 in the overlap region 630, and may not extend through the thickness of the first plate 610. In some examples, a length of the screw slot 612 of the first plate 610 may be greater than a length of the through hole 622 of the second plate 620. In some examples, the screw slot 612 may be curved. In other examples, the screw slot 612 may have any other suitable shape.

The second plate 620 may include a first end portion 621 and a second end portion 623. The second end portion 623 may be disposed in the overlap region 630. The screw slot 612 of the first plate 610 and the through hole 622 of the second plate 620 may be disposed closer to the second end portion 623 than the connecting holes 614, 624 of the first and second plates 610, 620.

In some examples, the apparatus 600 may further include a screw (e.g., screw 560 illustrated in FIGS. 16A and/or 16B) disposed in the screw slot 612 of the first plate 610 and the through hole 622 of the second plate 620. Other configurations/features/characteristics of the apparatus 600 (e.g. components, materials, dimensions) may be similar to and/or the same as the ones described above with respect to the apparatus 500 and, thus, duplicate description may be omitted.

In some examples, a method of fixing bone using any of the bone plates disclosed herein is provided. The steps presented herein may be performed in any suitable order and combination, and may be modified by or combined with any of the other procedures and features disclosed elsewhere herein.

The method may include mating a first plate with a second plate and placing a screw body into a screw slot of the first plate and the through hole of the second plate. For example, the first plate 510/610 may be mated with the second plate 520/620, and a screw body 550 may be placed into the screw slot 512/612 of the first plate 510/610 and the through hole 522/622 of the second plate 520/620, for example, using the insertion portion 570 of the screw body 550.

The method may further include removing the insertion portion of the screw body. For example, the insertion portion 570 of the screw body 550 may be removed after the screw portion 560 is inserted into the screw slot 512/612 and the through hole 522/622. The screw portion 560 may remain within the screw slot 512/612 and the through hole 522/622 after the insertion portion 570 is removed.

In some examples, when placing the screw body 550 into the screw slot 512/612 and the through hole 522/622, the screw body 550 may be tightened so that a torque applied to the screw portion 560 reaches a first predetermined torque value. The first predetermined torque value may correspond to a first amount of force/moment that is required in order to rotate the first plate 510/610 and the second plate 520/620 relative to one another.

Figure 20:
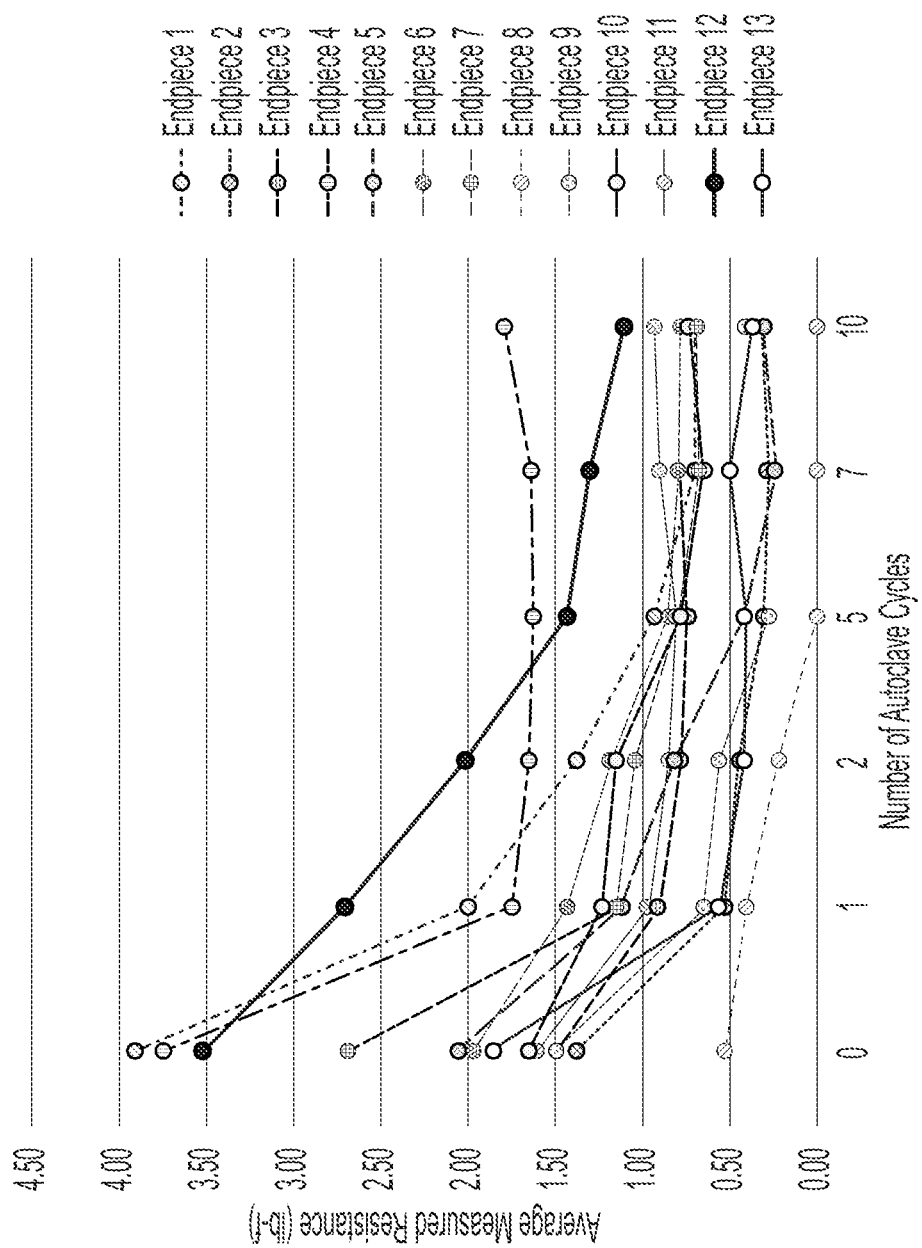
FIG. 20 is a graph showing an average measured resistance/friction between plates coupled to each other using a screw made with a plastic material (e.g., PEEK) with respect to the number of autoclave cycles.

In some examples, the method may also include heating the first plate 510/610 and the second plate 520/620 (while the plates 510/610, 520/620 are coupled to each other via the screw portion 560) in one or more heating cycles (e.g., during autoclave sterilization/treatment). When the screw 560 is made with a plastic material (e.g., PEEK), the screw 560 may be relaxed during the heating cycles. In this case, the amount of force/moment that is required to rotate the first and second plates 510/610, 520/620 relative to one another may be decreased below the first amount of force/moment, thereby resulting in the drag/friction being decreased below a targeted value. For example, as shown in FIG. 20, which illustrates an average measured resistance/friction between the plates coupled to each other using a screw made with a plastic material (e.g., PEEK) with respect to the number of autoclave cycles, the amount of force/moment that is required to rotate the plates relative to one another decreases as the number of autoclave cycles are increased.

Therefore, in some examples, after the heating step/cycle, the screw body 550 may be re-tightened so that a torque applied to the screw portion 560 reaches a second predetermined torque value. The second predetermined torque value may correspond to a second amount of force/moment that is required to rotate the first plate 510/610 and the second plate 520/620 relative to one another. The second amount of force/moment may be (substantially) the same as the first amount of force/moment, thereby ensuring that the targeted drag/friction is achieved.

In some examples, a plurality of the heating steps/cycles (autoclave sterilization/treatment) may be repeated. In this case, the screw body 550 may be re-tightened after each or only some of the heating steps/cycles. In some examples, the screw body 550 may be re-tightened after a final heating step/cycle. In some examples, the screw body 550 may be re-tightened (only) after a certain number of heating steps/cycles (e.g., 2, 3, 4, 5, 6, 7, 8, 9, or 10).

In some examples, the temperature at which the first plate 510/610, second plate 520/620, and the screw portion 560 are heated may be in a range of about 250° C. to about 270° C. In other examples, the first plate 510/610, second plate 520/620, and the screw portion 560 may be heated at any other suitable temperature (e.g., lower than 250° C. or greater than 270° C.).

In some examples, when placing the screw body 550 into the screw slot 512/612 and the through hole 522/622, the screw body 550 may be overtightened so that a torque applied to the screw portion reaches a third predetermined torque value. The third predetermined torque value may correspond to a third amount of force/moment that is required in order to rotate the first plate 510/610 and the second plate 520/620 relative to one another. The third amount of force/moment may be greater than the first and second amounts of force/moment.

Then, the first plate 510/610 and the second plate 520/620 that are (overtightened and) coupled to each other via the screw portion 560 may be heated in one or more heating cycles. After the heating, the torque of the screw portion 560 may reach a fourth predetermined torque value. The fourth predetermined torque value may correspond to a fourth amount of force/moment that is required in order to rotate the first plate 510/610 and the second plate 520/620 relative to one another. The third amount of force/moment may be greater than the fourth amount of force/moment. In this way, the overtightening of the screw may ensure that the apparatus 500 maintains a targeted drag/friction between the first and second plates 510/610, 520/620.

In some examples, when the screw is overtightened (before the heating step/cycle), it may not need to be re-tightened after the heating step. In other examples, although the screw is overtightened (before the heating step/cycle), the screw body 550 may be re-tightened, for example, after a certain and/or final heating step/cycle.

In some examples, the fourth amount of force/moment may be (substantially) the same as the first/second amount of force/moment, thereby ensuring that the targeted drag/friction is achieved. In some examples, the target (first/second/fourth) amount of force/moment that is required to rotate the first and second plates 510/610, 520/620 relative to one another may be in a range of about 0.5 in-lbs to about 15 in-lbs. In some examples, the target torque value (e.g., first, second, fourth torque value) applied to the screw portion 560 may be in a range of about 1 in-lbs to about 10 in-lbs.

In this way, aspects of the present disclosure may provide an improved bone plate assembly that can be easily, cost-effectively, and consistently made using a plastic (e.g., PEEK) screw.

Figure 21:
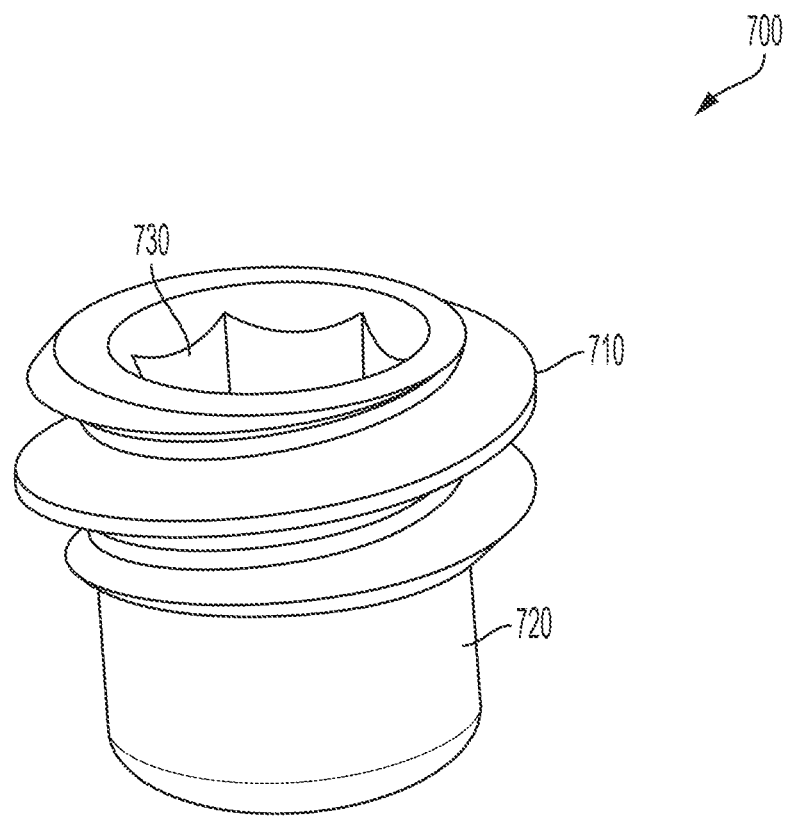
FIG. 21 is a schematic view of an exemplary screw for an apparatus for fixing bone according to an example of the present disclosure.

FIG. 21 illustrates another example screw 700 according to an example of the present disclosure. The screw 700 may include a threaded portion 710 and a non-threaded portion 720. The screw 700 may further include a recess 730. The recess 730 may be formed in the center of the top surface of the screw 700. The recess 730 may be a driver receiving recess configured to receive a driver.

In some examples, the screw 700 may be made with a metal material, for example, titanium. In other examples, the screw 700 may be made with any other suitable metal material. In some examples, the screw 700 may be a set screw. In other examples, the screw 700 may be any other suitable device that functions as a screw. The screw 700 may be sized or shaped to be inserted into the first plate 510/610 and the second plate 520/620 of the apparatus 500/600 for bone fixing.

Figure 22A:
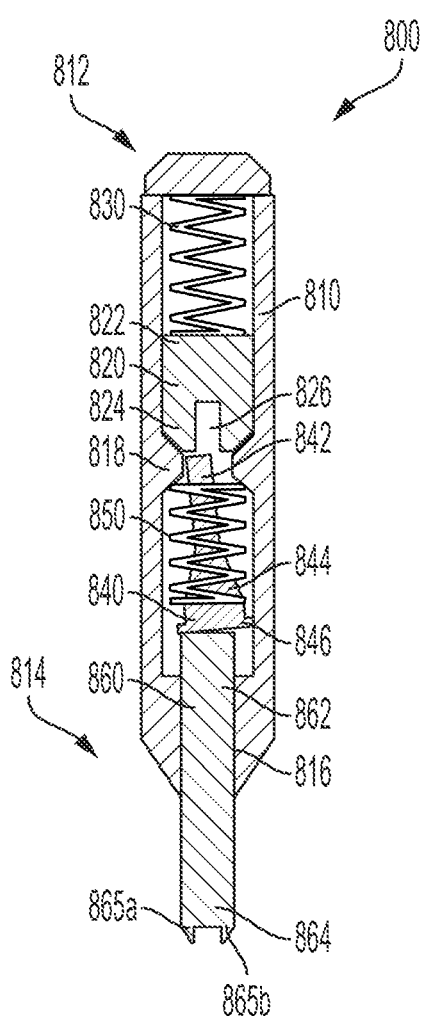
FIG. 22A illustrates an example automatic compression tool according to an example of the present disclosure.

FIG. 22A illustrates an example automatic compression tool 800 according to an example of the present disclosure. The automatic compression tool 800 may be used with the screw 700 to prevent the screw 700 from backing out from the screw slot 512/612 and the through hole 522/622. The automatic compression tool 800 may include a casing body 810, a hammer body 820, a first biasing device 830, a middle rod 840, a second biasing device 850, and a punching rod 860.

The casing body 810 may include a first end portion 812 and a second end portion 814. The first end portion 812 may include a cap. The second end portion 814 may have an opening 816, through which the punching rod 860 extends. The casing body 810 may further include an internal protrusion 818. The internal protrusion 818 may be provided to block the hammer body 820.

The hammer body 820 may include a first end portion 822 and a second end portion 824. The second end portion 824 of the hammer body 820 may include a groove 826. The groove 826 may be provided to receive a top portion of the middle rod 840.

The first biasing device 830 may be disposed between the first end portion 812 of the casing body 810 (e.g., cap) and the first end portion 822 of the hammer body 820. In some examples, the first biasing device 830 may be a spring. In other examples, the first biasing device 830 may be any other suitable biasing device (e.g., rubber or any other suitable elastic material). The first biasing device 830 may bias the hammer body 820 toward the middle rod 840.

The middle rod 840 may be disposed between the hammer body 820 and the punching rod 860. The middle rod 840 may include a first (top) portion 842, a second (middle) portion 844, and a third (bottom) portion 846. The diameter of the third portion 846 may be greater than the diameter of the first portion 842. The second portion 844 may be tapered.

The second biasing device 850 may be provided over the middle rod 840. For example, the second biasing device 850 may cover the first and second portions 842, 844 of the middle rod 840. In some examples, the second biasing device 850 may be a spring. In other examples, the second biasing device 850 may be any other suitable biasing device (e.g., rubber or any other suitable elastic material). The second biasing device 850 may bias the middle rod 840 toward the punching rod 860.

The punching rod 860 may include a first end portion 862 adjacent the middle rod 840 and a second end portion 864. In some examples, the second end portion 864 of the punching rod 860 (e.g., the bottom surface thereof) may include one or more punching pins 865a, 865b. In some examples, the one or more punching pins 865a, 865b may be formed at or near the edge portion of the bottom surface of the punching rod 860. The one or more punching pins 865*a*, 865*b* may protrude from the bottom surface of the punching rod 860 at or near the edge portion of the bottom surface.

Figure 22B:
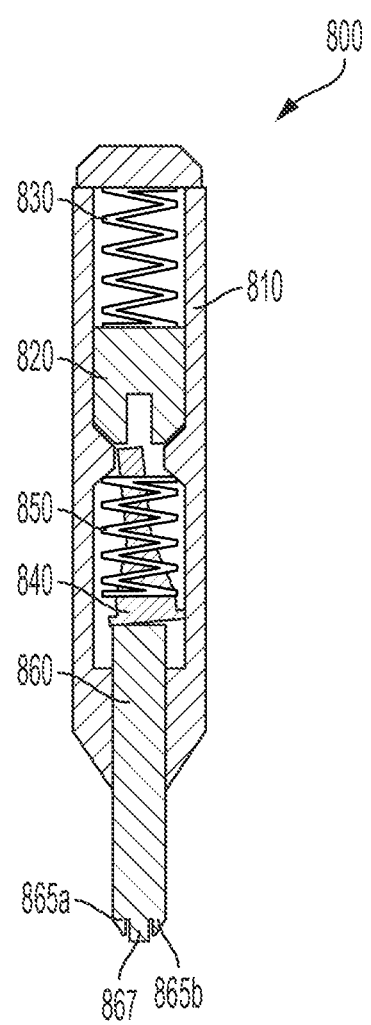
FIG. 22B illustrates an example automatic compression tool according to an example of the present disclosure.
Figure 23B:
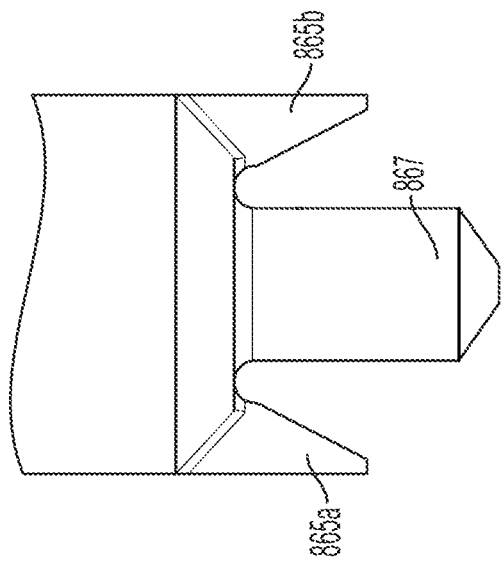
FIG. 23B is a front expanded view of the punching rod of the automatic compression tool of FIG. 22B.
Figure 23A:
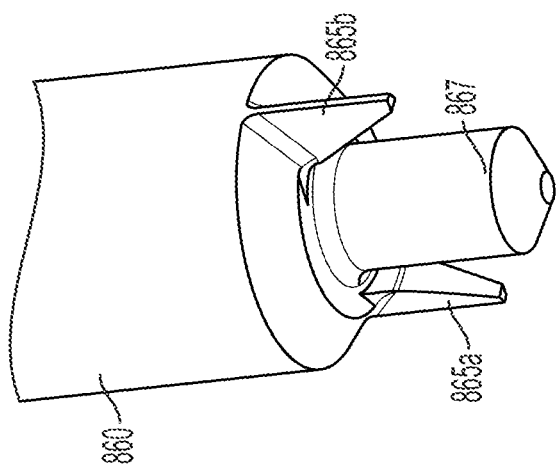
FIG. 23A is a perspective expanded view of a punching rod of the automatic compression tool of FIG. 22B.

FIG. 22B illustrates another example automatic compression tool 800 according to an example of the present disclosure. The punching rod 860 of the automatic compression tool 800 may further include an alignment guide 867. FIGS. 23A and 23B are expanded views of the punching rod 860 with the alignment guide 867. The alignment guide 867 may be formed at or near the center of the bottom surface of the punching rod 860. The alignment guide 867 may protrude from the bottom surface of the punching rod 860 at or near the center of the bottom surface. In some examples, the height of the alignment guide 867 may be greater than the height of the one or more punching pins 865*a*, 865*b*. In some examples, the alignment guide 867 may be sized and shaped according to the (expected) dimensions of the recess 730 of the screw 700.

The automatic compression tool 800 may be used to hit the screw, for example, after the first plate 510/610 and the second plate 520/620 are mated to each other, and the screw 700 (e.g., a metal screw) is placed into the screw slot 512/612 and the through hole 522/622. Hitting the screw 700 by the automatic compression tool 800 may causes at least a partial deformation to the screw 700 and/or a portion of the first plate 510/610 or the second plate 520/620 that is connected to the screw 700. In this way, the screw 700 may be prevented from backing out from the screw slot 512/612 and the through hole 522/622.

When hitting the screw with the punching rod 860, the alignment guide 868 of the punching rod 860 may help the punching rod 860 be aligned with the screw 700. For examples, as the punching rod 860 is pressed against the screw 700, the alignment guide 868 (in the center of the bottom surface of the punching rod 860) may be slid/placed into the recess 730 of the screw 700 (in the center of the top surface of the screw 700), thereby aligning the punching rod 860 with the screw 700.

As the casing body 810 continues to be pressed against the screw 700 after/while the punching rod 860 is aligned with the screw 700, the punching rod 860 may move into the casing body 810, which may cause the middle rod 840 to push the hammer body 820 away from the protrusion 818. At this time, the first and second biasing devices 830, 850 may be compressed. Then, as the top portion 842 of the middle rod 840 is slid/inserted into the groove 826 of the hammer body 820, the first biasing device 830 may push the hammer body 820 toward the middle rod 840, thereby hitting the middle rod 840. The impact of the middle rod 840 being hit by the hammer body 820 may be transferred to the punching rod 860, which, in turn, may be transferred to the screw 700.

Figure 24:
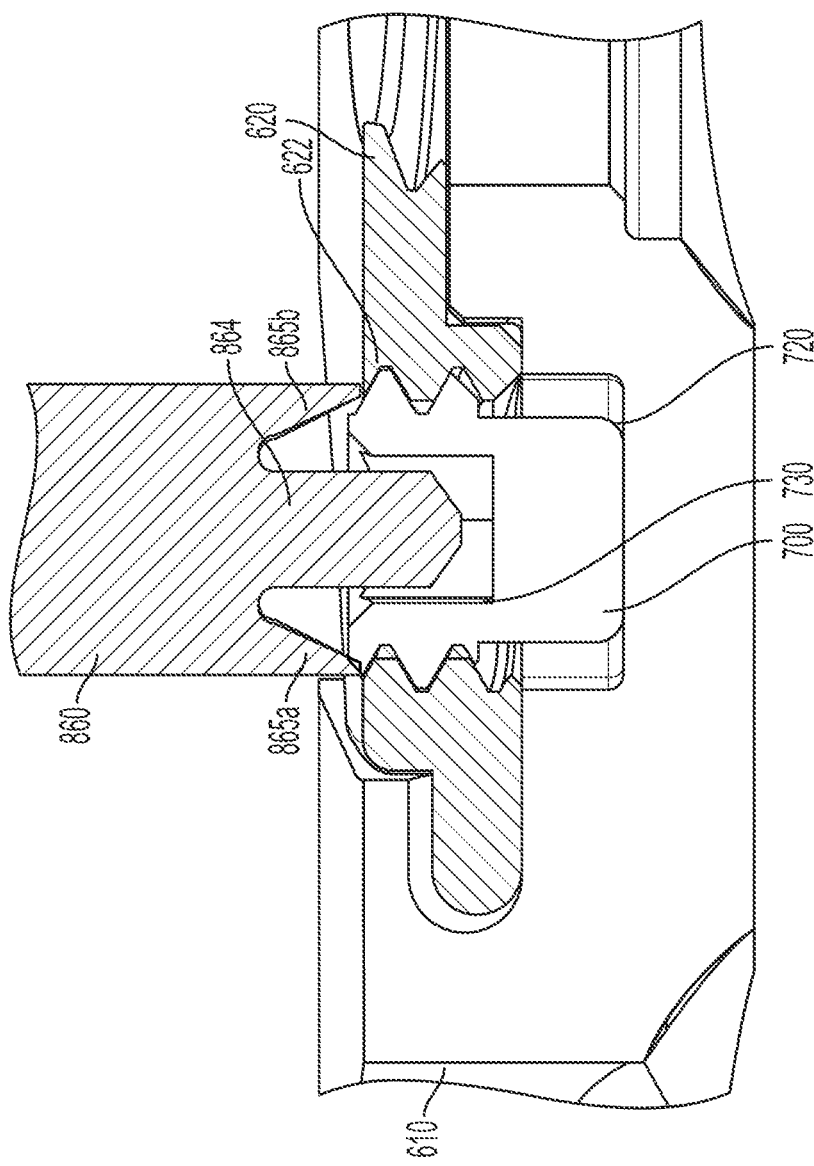
FIG. 24 is a schematic view of an exemplary apparatus for fixing bone with a screw installed therein and a punching rod in contact with the screw.

Hitting the screw 700 with the punching rod 860 may include hitting the screw 700 at a seam of the screw 700 and/or the first/second plate with the one or more punching pins 865*a*, 865*b*. For example, as shown in FIG. 24, as the punching rod 860 approaches the screw 700, the alignment guide 867 may be slid/inserted into the recess 730 of the screw 700, and the seam/edge portion of the top surface of the screw 700 (and/or the second plate 620) may be hit by the one or more punching pins 865*a*, 865*b*. The force from the hammer body 820 may be transferred to the seam/edge portion of the top surface of the screw 700 via the one or more punching pins 865*a*, 865*b*.

In some examples, at least two of the first plate 510/610, the second plate 520/620, and the screw 700 may be anodized. The thickness of the anodized surface (e.g., oxide layer) of the at least two of the first plate 510/610, the second plate 520/620, and the screw 700 may be in a range of about 0.2 µm to about 2.5 µm. In some examples, all three of the first plate 510/610, the second plate 520/620, and the screw 700 may be anodized.

When all of the first plate 510/610, the second plate 520/620, and the screw 700 are made with a metal material (e.g., titanium), this may create galling and lead to an inconsistent feel when articulating the first/second plates 510/610, 520/620. The inventors surprisingly found that when at least two of the first plate 510/610, the second plate 520/620, and the screw 700 are anodized to form an oxide layer (e.g., titanium oxide layer) having a thickness in a range of about 0.2 µm to about 2.5 µm, the occurrence of galling is prevented and the apparatus 500/600 has a smooth articulation. The first plate 510/610, the second plate 520/620, and the screw 700 may be anodized before they are assembled together.

EMBODIMENTS

Various aspects of the subject matter described herein are set out in the following numbered embodiments:

Embodiment 1. An apparatus for fixing bone comprises a first plate comprising a screw slot; a second plate coupled to the first plate in a region of overlap by a hinge joint configured to allow a rotation of the first and second plates relative to one another about a pivot axis, wherein the second plate comprises a through hole corresponding to the screw slot, wherein the screw slot and the through hole are disposed in the region of overlap; and a screw disposed in the screw slot and the through hole, wherein the screw comprises a threaded portion, wherein the first plate, the second plate, and the screw define a range of rotation for the first and second plates about the pivot axis.

Embodiment 2. The apparatus of embodiment 1, wherein the screw comprises a set screw.

Embodiment 3. The apparatus of any one of embodiments 1-2, wherein the screw is made with at least one of a polyether ether ketone (PEEK) material or a high molecular weight polyethylene (HMWPE) material.

Embodiment 4. The apparatus of any one of embodiments 1-3, wherein the through hole includes an internal thread.

Embodiment 5. The apparatus of embodiment 4, wherein a major diameter of the screw is greater than a diameter of a corresponding portion of the internal thread.

Embodiment 6. The apparatus of any one of embodiments 4-5, wherein a minor diameter of the screw is greater than a diameter of a corresponding portion of the internal thread.

Embodiment 7. The apparatus of any one of embodiments 4-6, wherein there is a pitch mismatch between the screw and the internal thread.

Embodiment 8. The apparatus of any one of embodiments 1-7, wherein a length of the screw slot is greater than a length of the through hole, wherein the screw slot is curved.

Embodiment 9. The apparatus of any one of embodiments 1-8, wherein the screw is fixed within the through hole and is movable within the screw slot.

Embodiment 10. The apparatus of any one of embodiments 1-9, wherein the screw is made with a metal material.

Embodiment 11. The apparatus of any one of embodiments 1-10, wherein at least two of the first plate, the second plate, and the screw are anodized.

Embodiment 12. The apparatus of embodiment 11, wherein a thickness of an anodized surface of the at least two of the first plate, the second plate, and the screw is in a range of about 0.2 µm to about 2.5 µm.

Embodiment 13. The apparatus of any one of embodiments 1-12, wherein the screw further comprises a non-threaded portion.

Embodiment 14. A method of manufacturing an apparatus for fixing bone comprises: mating a first plate with a second plate, wherein the first plate comprises a screw slot and the second plate comprises a through hole corresponding to the screw slot; placing a screw body into the screw slot and the through hole, wherein the screw body comprises a screw portion and an insertion portion, wherein the screw body is placed into the screw slot using the insertion portion of the screw body; and removing the insertion portion of the screw body, wherein the screw portion remains within the screw slot and the through hole after the insertion portion is removed.

Embodiment 15. The method of embodiment 14, wherein the screw body is made with at least one of a polyether ether ketone (PEEK) material or a high molecular weight polyethylene (HMWPE) material.

Embodiment 16. The method of any one of embodiments 14-15, wherein a diameter of the insertion portion is greater than a diameter of the screw portion.

Embodiment 17. The method of any one of embodiments 14-16, wherein placing the screw body into the screw slot and the through hole comprises tightening the screw body so that a torque applied to the screw portion reaches a first predetermined torque value, wherein the first predetermined torque value corresponds to a first amount of force that is required in order to rotate the first plate and the second plate relative to one another.

Embodiment 18. The method of any one of embodiments 14-17, further comprising heating the first plate and the second plate coupled to each other via the screw portion in one or more heating cycles.

Embodiment 19. The method of any one of embodiments 14-18, further comprising re-tightening the screw body so that a torque applied to the screw reaches a second predetermined torque value, wherein the second predetermined torque value corresponds to a second amount of force that is required to rotate the first plate and the second plate relative to one another.

Embodiment 20. The method of embodiment 19, wherein the first predetermined torque value is the same as the second predetermined torque value.

Embodiment 21. The method of any one of embodiments 18-20, wherein the first plate, second plate, and the screw portion are heated at a temperature in a range of about 250° C. to about 270° C.

Embodiment 22. The method of any one of embodiments 14-21, wherein placing the screw body into the screw slot and the through hole comprises overtightening the screw body so that a torque applied to the screw portion reaches a third predetermined torque value, wherein the third predetermined torque value corresponds to a third amount of force that is required in order to rotate the first plate and the second plate relative to one another.

Embodiment 23. The method of embodiment 22, further comprising heating the first plate and the second plate coupled to each other via the screw portion in one or more heating cycles, wherein the torque of the screw reaches a fourth predetermined torque value after the heating, wherein the fourth predetermined torque value corresponds to a fourth amount of force that is required in order to rotate the first plate and the second plate relative to one another, wherein the third amount of force is greater than the fourth amount of force.

Embodiment 24. A method of manufacturing an apparatus for fixing bone comprises: mating a first plate with a second plate, wherein the first plate comprises a screw slot and the second plate comprises a through hole corresponding to the screw slot; placing a screw into the screw slot and the through hole; and hitting the screw, wherein hitting the screw causes at least a partial deformation to at least one of the screw and a portion of the first plate or the second plate that is connected to the screw, thereby preventing the screw from backing out from the screw slot and the through hole.

Embodiment 25. The method of embodiment 24, wherein the screw is made with a metal material.

Embodiment 26. The method of any one of embodiments 24-25, wherein hitting the screw comprises hitting the screw using a compression tool.

Embodiment 27. The method of embodiment 26 wherein the compression tool comprises an alignment guide and at least one punching pin, and the screw comprises a recess on a top surface thereof, wherein hitting the screw comprises: placing the alignment guide into the recess of the screw, thereby aligning the compression tool with the screw; and hitting the screw at a seam of the screw and the first/second plate with the at least one punching pin.

Embodiment 28. The method of any one of embodiments 24-27, wherein the screw comprises a set screw.

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

Reference throughout the specification to "various aspects," "some aspects," "some examples," "other examples," "some cases," or "one aspect" means that a particular feature, structure, or characteristic described in connection with the aspect is included in at least one example. Thus, appearances of the phrases "in various aspects," "in some aspects," "certain embodiments," "some examples," "other examples," "certain other embodiments," "some cases," or "in one aspect" in places throughout the specification are not necessarily all referring to the same aspect. Furthermore, the particular features, structures, or characteristics illustrated or described in connection with one example may be combined, in whole or in part, with features, structures, or characteristics of one or more other aspects without limitation.

When the position relation between two parts is described using the terms such as "on," "above," "below," "under," and "next," one or more parts may be positioned between the two parts unless the terms are used with the term "immediately" or "directly." Similarly, as used herein, the terms "coupled," "attachable," "attached," "connectable," "connected," or any similar terms may include directly or indirectly coupled, directly or indirectly attachable, directly or indirectly attached, directly or indirectly connectable, and directly or indirectly connected.

It is to be understood that at least some of the figures and descriptions herein have been simplified to illustrate elements that are relevant for a clear understanding of the disclosure, while eliminating, for purposes of clarity, other elements. Those of ordinary skill in the art will recognize, however, that these and other elements may be desirable. However, because such elements are well known in the art, and because they do not facilitate a better understanding of the disclosure, a discussion of such elements is not provided herein.

The terminology used herein is intended to describe particular embodiments only and is not intended to be limiting of the present disclosure. As used herein, the singular forms "a," "an," and "the" are intended to include the plural forms as well, unless otherwise indicated. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "at least one of X or Y" or "at least one of X and Y" should be interpreted as X, or Y, or X and Y.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of manufacturing an apparatus for fixing bone, the method comprising:
    mating a first plate with a second plate, wherein the first plate comprises a screw slot and the second plate comprises a through hole corresponding to the screw slot;
    placing a screw body into the screw slot and the through hole and tightening the screw body so that a torque applied to a screw portion reaches a first predetermined torque value, wherein the first predetermined torque value corresponds to a first amount of force that is required in order to rotate the first plate and the second plate relative to one another, wherein the screw body comprises the screw portion and an insertion portion, wherein the screw body is placed into the screw slot using the insertion portion of the screw body;
    removing the insertion portion of the screw body, wherein the screw portion remains within the screw slot and the through hole after the insertion portion is removed; and
    heating the first plate and the second plate coupled to each other via the screw portion in one or more heating cycles.

2. The method of claim 1, wherein the screw body is made with at least one of a polyether ether ketone (PEEK) material or a high molecular weight polyethylene (HMWPE) material.

3. The method of claim 1, wherein a diameter of the insertion portion is greater than a diameter of the screw portion.

4. The method of claim 1, further comprising re-tightening the screw body so that the torque applied to the screw portion reaches a second predetermined torque value, wherein the second predetermined torque value corresponds to a second amount of force that is required to rotate the first plate and the second plate relative to one another.

5. The method of claim 4, wherein the first predetermined torque value is the same as the second predetermined torque value.

6. The method of claim 1, wherein the first plate, the second plate, and the screw portion are heated at a temperature in a range of about 250° C. to about 270° C.

7. The method of claim 1, wherein the through hole includes an internal thread.

8. The method of claim 7, wherein a major diameter of the screw portion is greater than a diameter of a corresponding portion of the internal thread.

9. The method of claim 7, wherein a minor diameter of the screw portion is greater than a diameter of a corresponding portion of the internal thread.

10. The method of claim 7, wherein there is a pitch mismatch between the screw portion and the internal thread.

11. The method of claim 1, wherein a length of the screw slot is greater than a length of the through hole, wherein the screw slot is curved.

12. A method of manufacturing an apparatus for fixing bone, the method comprising:
    mating a first plate with a second plate, wherein the first plate comprises a screw slot and the second plate comprises a through hole corresponding to the screw slot;
    placing a screw into the screw slot and the through hole; and
    hitting the screw using a compression tool, wherein hitting the screw causes at least a partial deformation to at least one of the screw and a portion of the first plate or the second plate that is connected to the screw, thereby preventing the screw from backing out from the screw slot and the through hole,
    wherein the compression tool comprises an alignment guide and at least one punching pin, and the screw comprises a recess on a top surface thereof, wherein hitting the screw comprises:
        placing the alignment guide into the recess of the screw, thereby aligning the compression tool with the screw; and
        hitting the screw at a seam of the screw and the first/second plate with the at least one punching pin.

13. The method of claim 12, wherein the screw is made with a metal material.

14. The method of claim 12, wherein the screw comprises a set screw.

15. A method of manufacturing an apparatus for fixing bone, the method comprising:
    mating a first plate with a second plate, wherein the first plate comprises a screw slot and the second plate comprises a through hole corresponding to the screw slot;
    placing a screw body into the screw slot and the through hole and overtightening the screw body so that a torque applied to a screw portion reaches a first predetermined torque value, wherein the first predetermined torque value corresponds to a first amount of force that is required in order to rotate the first plate and the second plate relative to one another, wherein the screw body comprises the screw portion and an insertion portion, wherein the screw body is placed into the screw slot using the insertion portion of the screw body;
    removing the insertion portion of the screw body, wherein the screw portion remains within the screw slot and the through hole after the insertion portion is removed; and
    heating the first plate and the second plate coupled to each other via the screw portion in one or more heating cycles, wherein the torque of the screw portion reaches a second predetermined torque value after the heating, wherein the second predetermined torque value corresponds to second amount of force that is required in order to rotate the first plate and the second plate relative to one another, wherein the first amount of force is greater than the second amount of force.

16. The method of claim 15, wherein the screw body is made with at least one of a polyether ether ketone (PEEK) material or a high molecular weight polyethylene (HMWPE) material.

17. The method of claim 15, wherein a diameter of the insertion portion is greater than a diameter of the screw portion.

18. The method of claim 15, further comprising re-tightening the screw body so that the torque applied to the screw portion reaches a third predetermined torque value, wherein the third predetermined torque value corresponds to a third amount of force that is required to rotate the first plate and the second plate relative to one another.

19. The method of claim 15, wherein the first plate, the second plate, and the screw portion are heated at a temperature in a range of about 250° C. to about 270° C.

20. The method of claim 15, wherein the through hole includes an internal thread.

21. The method of claim 20, wherein a major diameter of the screw portion is greater than a diameter of a corresponding portion of the internal thread.

22. The method of claim 20, wherein a minor diameter of the screw portion is greater than a diameter of a corresponding portion of the internal thread.

23. The method of claim 20, wherein there is a pitch mismatch between the screw portion and the internal thread.

24. The method of claim 15, wherein a length of the screw slot is greater than a length of the through hole, wherein the screw slot is curved.

* * * * *